(12) United States Patent
Stefansson et al.

(10) Patent No.: US 6,252,373 B1
(45) Date of Patent: Jun. 26, 2001

(54) APPARATUS FOR RAPIDLY CHARGING AND RECONDITIONING A BATTERY

(75) Inventors: Hafthor Stefansson, Chandler, AZ (US); Michael Tiso, Fort Wayne, IN (US)

(73) Assignee: Ion Control Solutions, Fort Wayne, IN (US)

( * ) Notice: Subject to any disclaimer, the term of this patent is extended or adjusted under 35 U.S.C. 154(b) by 0 days.

(21) Appl. No.: 09/650,889

(22) Filed: Aug. 30, 2000

Related U.S. Application Data

(63) Continuation-in-part of application No. 09/558,118, filed on Apr. 25, 2000.
(60) Provisional application No. 60/131,017, filed on Apr. 26, 1999.

(51) Int. Cl.[7] .......................... H01M 10/44; H01M 10/46
(52) U.S. Cl. ........................... 320/106; 320/141; 320/160
(58) Field of Search ............................... 320/106, 110, 320/118, 127, 128, 124, 125, 132, 139, 141, 160

(56) References Cited

U.S. PATENT DOCUMENTS

| | | |
|---|---|---|
| 508,069 | 11/1893 | Whiting . |
| 2,509,239 | 5/1950 | Mattheyses ............................. 320/26 |
| 2,711,504 | 6/1955 | King ....................................... 320/25 |
| 3,118,101 | 1/1964 | Arber ..................................... 320/26 |
| 3,273,039 | 9/1966 | Godshalk et al. ..................... 320/26 |
| 3,413,487 | 11/1968 | Gershen ................................ 307/127 |
| 3,593,101 | 7/1971 | Wassink ................................ 320/25 |
| 3,700,999 | 10/1972 | Gourse .................................. 320/26 |
| 4,027,223 | 5/1977 | Renz ..................................... 320/26 |
| 4,361,795 | 11/1982 | Santilli ................................... 320/26 |
| 4,423,456 | 12/1983 | Zaidenweber ......................... 361/77 |
| 4,871,957 | 10/1989 | Taranto et al. ........................ 320/26 |
| 4,876,496 | 10/1989 | Duncan ................................. 320/31 |
| 4,994,727 | 2/1991 | Yang ..................................... 320/26 |
| 5,049,804 | * 9/1991 | Hutchings . |
| 5,072,167 | 12/1991 | Zias ....................................... 320/26 |
| 5,103,155 | 4/1992 | Joannou ................................ 320/26 |
| 5,371,455 | 12/1994 | Chen ..................................... 320/26 |
| 5,420,493 | * 5/1995 | Hargadon et al. . |
| 5,486,750 | 1/1996 | Walborn et al. ....................... 320/25 |
| 5,541,492 | 7/1996 | Fernandez et al. . |
| 5,541,495 | 7/1996 | Gali ....................................... 320/26 |
| 5,565,756 | 10/1996 | Urbish et al. . |
| 5,838,143 | 11/1998 | Lo ........................................ 320/16 J |

* cited by examiner

*Primary Examiner*—Edward H. Tso
(74) *Attorney, Agent, or Firm*—Baker & Daniels

(57) ABSTRACT

Apparatus for rapidly charging a battery including an output adapted to be electrically connected to a battery and a control device electrically connected to the output. The control device includes a power supply and a microcontroller. The microcontroller includes PWM firmware using software interleaving for controlling the power supply and a plurality of battery charging stages.

32 Claims, 17 Drawing Sheets

APPARATUS FOR RAPIDLY CHARGING AND RECONDITIONING A BATTERY

CROSS-REFERENCE TO RELATED APPLICATION

This is a continuation-in-part of patent application Ser. No. 09/558,118, filed Apr. 25, 2000, which is related to and claims the benefit under 35 U.S.C. §119(e) of U.S. Provisional Application No. 60/131,017, filed Apr. 26, 1999.

BACKGROUND OF THE INVENTION

The invention relates generally to devices for charging, formatting, and reconditioning batteries. More particularly, the invention relates to devices for rapidly charging and/or reconditioning a battery that have flexibility in the type of charging profiles supported. These charging profiles primarily consist of charging stages which include repeating charge pulses, discharge pulses, such as by applying a load across the battery, and wait or rest periods. An example of an apparatus for rapidly charging and reconditioning a battery is disclosed in U.S. Pat. No. 5,998,968, which is assigned to the assignee of the present invention and expressly incorporated herein by reference.

Batteries are commonly used to provide a direct-current (dc) source of electrical energy in a wide variety of applications. A battery generally consists of a plurality of cells grouped together in a common container and electrically connected to provide a particular dc source. For example, four 1.5 volt cells rated at 1 ampere (amp) may be series connected to provide a 6 volt dc source rated at 1 amp. Cells may also be connected in parallel, e.g., four 1.5 volt cells rated at 1 amp connected in parallel provide a 1.5 volt dc source rated at 4 amps, or in a combined series-parallel fashion. The cell consists of two electrodes, one connected to a positive terminal and the other connected to a negative terminal, which serve as conductors through which current enters and leaves the battery. The electrodes or plates are surrounded by an electrolyte that acts, electrochemically, upon the electrodes in a manner dependent upon the nature of the materials used to comprise the battery.

The nature of the materials used to comprise the battery will also determine if the electrochemical reaction is reversible or not. Cells with reversible reactions are considered of "secondary" type, whereas non-reversible reactions are considered of "primary" type. The present invention is essentially concerned only with secondary cell type batteries, which may be recharged by forcing an electrical current through the battery in a direction opposite to that of discharge, thereby reversing the electrochemical reaction. The storage capacity of a battery is generally rated according to ampere-hour capacity, e.g. a battery that delivers an average of 10 amps without interruption over a 2 hour period, at the end of which time the battery is completely discharged upon reaching a low voltage limit, has a capacity rating of 20 (10×2) amp-hours. If discharged at a faster rate, e.g. over one hour instead of two, the battery will deliver less than the rated capacity.

Battery charging is, in its simplest terms, accomplished through delivery of a current to a battery, thereby ionizing the plates to opposing potentials (voltages or electrical pressures) and reversing the electrochemical process that occurs when the battery is used to supply energy to a load. With a linear charger, this is achieved through the use of a marginally higher charger voltage vs. what the battery's maximum rest voltage is. Usually, in the most rudimentary charger types, minimal consideration is given to regulation, whether it be current or voltage. The battery is simply allowed to drift up to its maximum potential. This is useable, albeit slow, and also does not treat the battery equally over time. When the battery is lowest, the most amount of current flows. If the time that it takes for the battery to charge is divided into five segments as shown in FIG. 8, often, the first time segment would appear to have charged the battery by about 70%, the next segment would be up to 90%. The remaining three time segments gradually approach the 100% charge level.

When charging a battery, it is preferred to use a charge voltage that is only marginally higher than the full battery potential. This is because higher voltages will increase the amount of secondary reactions that take place. An example of a secondary reaction would be the electrolysis of water in the electrolyte. The water will be split into oxygen and hydrogen gases. Another effect of higher voltages is waste heat. Energies not stored or used for secondary reactions are converted into heat. More advanced chargers use a pulsing technique to send bursts of energy to the battery at higher voltages. This is done in the hopes of reversing the secondary reactions while they are still within range of the plates. While this does get the job done quicker, the effects are to gradually destroy the battery by heating, and eventually evaporating, the electrolyte inside. One unfortunate effect of pulse charging is that in order to deliver the same amount of current over the charge duration, the pulses must be of higher current than a non-pulsing charger would be. This causes an increase in the "Joule effect:" losses that occur because of the internal resistance of the battery. For example, 10 amps delivered continuously into a battery that has a resistance of 10 milliohms results in 1 watt of wasted energy ($P_w = I_{CHG}^2 \times R_{BATT}$). A hypothetical pulsing charger with a duty cycle of 50% would have to deliver 20 amps in order to deliver the same level of current over the charge duration. The Joule effect losses quadruple to 4 watts during the pulses, yielding an average loss of 2 watts (20 A²×10 milliohms×50%). While pulse type charging has benefit, it may not be desirable over the full duration of charge and it may be advantageous to vary the parameters of the pulsing at different stages of the recharging process.

An alternative path is to use a constant current source, assuming that the battery is capable of accepting a set amount of current at any time. These chargers regulate current by automatically adjusting the voltage so a predetermined amount of current is delivered. Volume of current is the design factor, not the voltage of the battery. Unfortunately, the results here can be less than desirable. If the amount acceptable to the battery is overestimated, the battery becomes less willing to accept the current. The charger instantly compensates by raising the charge voltage. The battery heats up, which further exacerbates the situation by causing the battery to become even less able to accept further charging. The cycle continues. Without limits, this scenario could escalate to destruction of the battery.

The magnitude of the charge or load, the duration of the charge, load, and rest stages, and the particular sequencing of the three elements is dependent upon the particular battery type being charged or reconditioned. Further, the sequencing, magnitude, and duration of these stages may be varied during the process of charging or reconditioning the battery. Ideally, the batteries are measured while under load to determine the level of charge as this tends to give a more accurate measurement of the battery that would otherwise be colored by the battery's impedance, secondary reactions and the charge delivered.

Conventional battery chargers merely deliver steady voltages or constant current. A problem with the steady voltage chargers is that the battery cannot absorb all of the energy delivered in the early stages of charging and the charging process takes an excessive amount of time to complete due to the low current that flows in the later stages of charging. A problem with the constant current is that to completely charge the battery using a current to facilitate rapid charging, the battery heats up during the last part of the charging since there is more energy delivered than the batter can absorb at this time. Whenever there is more power being delivered to the battery than it can absorb, the excess is spent via electrolysis of the medium or conversion to heat energy.

Some chargers include a few charging stages that are sequenced through to charge the battery. However, these stages are hardware driven and require a hardware change to charge a battery with different charging characteristics.

One problem associated with prior art battery chargers, such as so-called wall-wart type chargers, concerns the amount of time required to fully charge a battery. Such known chargers generally require a period of 12–24 hours of continuous charging to fully charge a typical battery. This results in undesirable, extended down-times for devices being served by the battery being charged or the expense of purchasing and maintaining multiple batteries.

Another problem associated with the prior art is that these chargers can control only either the power supply voltage or current to charge the battery. The most efficient method of charging a particular battery at a particular state of charging may require a constant current, constant voltage, or limiting of both current and voltage.

Another problem associated with the prior art is that these chargers require hardware changes to charge batteries during different charging stages.

SUMMARY OF THE INVENTION

The present invention provides an improved battery charger and re-conditioner which employs a microprocessor based controller that provides flexibility in the type of charging profiles supported by having the capability to control the power supply to provide constant current, voltage, or power. The charger of the present invention delivers just the amount of power and current as the battery can absorb so as to avoid damage and inefficient overheating and more rapidly charge the battery.

The present invention utilizes a microprocessor having at least two digital output pins to control the charge pulse source and the load source, at least two A/D ports for reading the battery voltage, the charging current and firmware. The firmware includes software based Pulse Width Modulation (PWM) and a plurality of battery charging stages which combine to yield one or more charging profiles. With the PWM firmware the microcontroller can control power to the battery by current, voltage, or power. Interleaving is utilized to achieve greater resolution of the PWM, which yields finer control of the power supply. The battery charging stages allow the microprocessor to vary the technique of charging due to condition, or level of charge of the battery. These stages combine to create a charging profile. Multiple profiles can be included in the same charger to supported multiple battery types. The firmware can also be changed to provide new settings for the charger and profiles for charging batteries of different types.

Optimum charging characteristics depend on the type of battery being charged. Different types of batteries have differing abilities to reach full charge, show level of charge, and accept charge. However, it should be understood that these parameters may vary in accordance with the type of battery being charged. The three basic elements, discharge, charge and rest, may be grouped together in a variety of sequence configurations to effect a charging stage which can be sequenced with other stages to effect a complete charging process. The particular charge stage, that is, the particular sequencing of the three charge elements, may depend upon the state of charge in the battery at any given point in time. Multiple charge stages may be combined to charge a battery over a range of conditions. The level of charge of a battery is monitored throughout the charging process and as the level of charge changes, a corresponding change in the charging sequence may occur. By starting, the charge process with a sensing charging stage, decisions can be made as to what type of battery is being charged.

The present switched mode battery charger provides a microprocessor-driven circuit utilizing firmware and associated interface components to sense the charge of the battery, typically in terms of voltage, to implement the selection and sequencing of the charge profiles with their accompanying stages, to control the output of the power supply to the battery.

In another aspect, the present invention provides a microprocessor-driven circuit utilizing associated components to sense the type and rating of the battery, to implement the selection and sequencing of charge stages, and to control the output of the power supply to the battery.

In yet another aspect, the present invention provides a microprocessor-driven circuit utilizing a software interleave to increase the resolution of the power supply.

In still another aspect, the present invention provides an apparatus for rapidly charging a plurality of battery types having different rated voltages and different rated charge capacities through the use of different charging profiles.

One advantage associated with the present invention is that it provides a rapid switched mode battery charger that can bring a battery to full charge within a greatly reduced period of time as compared to battery chargers of the prior art.

Another advantage associated with the present invention is that it provides a charger capable of supplying a constant current, voltage or power to the battery being charged.

Another advantage associated with the present invention is that it provides a switched mode battery charger that requires no hardware changes to charge batteries of different types and/or sizes.

Another advantage associated with the present invention is that it achieves finer control of the power supply than would be possible with a non-firmware interleaved version running on the same microcontroller.

Another advantage associated with the present invention is that it achieves higher resolution of the current and voltage reading by taking multiple readings, coupled with an interleaved power source.

Another advantage associated with the present invention is that it can directly support multiple battery types and automatically select the appropriate charging profile through sensing stages.

Another advantage associated with the present invention is that it can detect certain types of battery failures through sensing stages.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
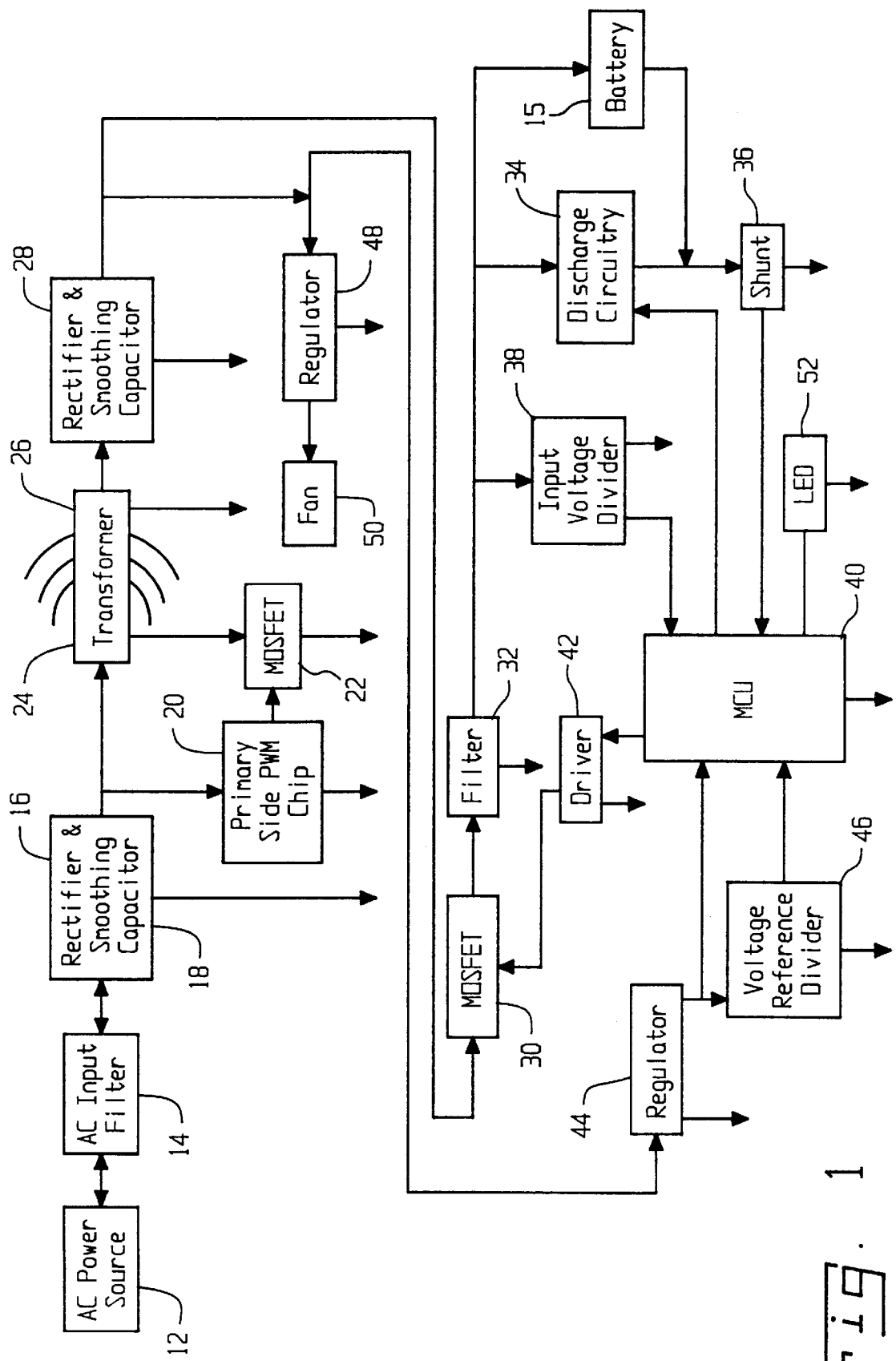
FIG. 1 is a block diagram of an electronic circuit illustrating one embodiment of the hardware associated with the switched mode battery charger of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DETAILED DESCRIPTION OF THE INVENTION

Referring now to the drawings and particularly to FIG. 1, the hardware associated with the switched mode battery charger of the present invention, generally designated at 10, is powered such as by conventional residential AC power source 12, typically 120 volts RMS. AC source 12 is connected to AC filter 13, which supplies AC power to rectifier 16 and capacitor 18 which convert the AC power to DC power. The output of rectifier 16 is a 170 volt rectified AC wave and the output of capacitor 18 is 170 volts DC. The output of capacitor 18 is connected to a transformer having primary side 24 and secondary side 26. Pulse width modulator (PM) 20 regulates the current and controls the electromagnetic field in primary side 24 of the transformer by using MOSFET 22 to switch current on and off to primary side 24. The switching rate of MOSFET 22 is approximately 80 kHz. The output of secondary side 26 of the transformer is approximately 25 volts AC which is then passed through rectifier and smoothing capacitor 28 to suppress negative voltages and to stabilize the DC voltage before delivered to main switching MOSFET 30. MOSFET 30 operated through driver circuitry 42 by microcontroller 40 allows microcontroller 40 to regulate the voltage and current output. The output of MOSFET 30 is connected to output filter 32 to smooth the voltage prior to delivery to rechargeable battery 15. Charger 10 also includes voltage regulator 48 which uses the 25 volt DC output from rectifier and capacitor 28 to provide 12 volts DC to cooling fan 50.

Microcontroller 40, Microchip model PIC16C71 or equivalent, regulates the charging of battery 15 by controlling the power output and discharge/load source. Inputs to microcontroller 40 include output or battery 15 voltage through voltage divider 38, a voltage representing the charging current through shunt 36, a primary reference from 5 volt regulator 44, and a secondary reference from voltage divider 46. Voltage divider 38 scales down the output or battery 15 voltage to a usable level for microcontroller 40. Shunt 36 includes a 50 milliohm resistor to provide feedback about the current flowing through battery 15. Voltage regulator 44 receives the 25 volt DC output from rectifier and capacitor 18 and deliveries 5 volts DC to power microcontroller 40. Voltage divider 46 receives the 5 volt output from voltage regulator 44 and provides a secondary voltage reference of 3 volts DC to microcontroller 40. The secondary voltage reference allows microcontroller 40 to obtain better accuracy when converting the small voltages from currrent shunt 36. Outputs from microcontroller 40 include control of MOSFET 30, discharge/load source 34, and LED 52. Microcontroller 40 controls driver circuitry 42 which drives MOSFET 30. This allows microcontroller 40 to regulate the voltage and current to battery 15. Discharge/load source 36 includes a load resistor which microcontroller 40 can switch into the circuit to partially discharge battery 15 during the charging process. LED 52 provides microcontroller 40 a method of providing status of the battery charging process to the operator.

Figure 6A:
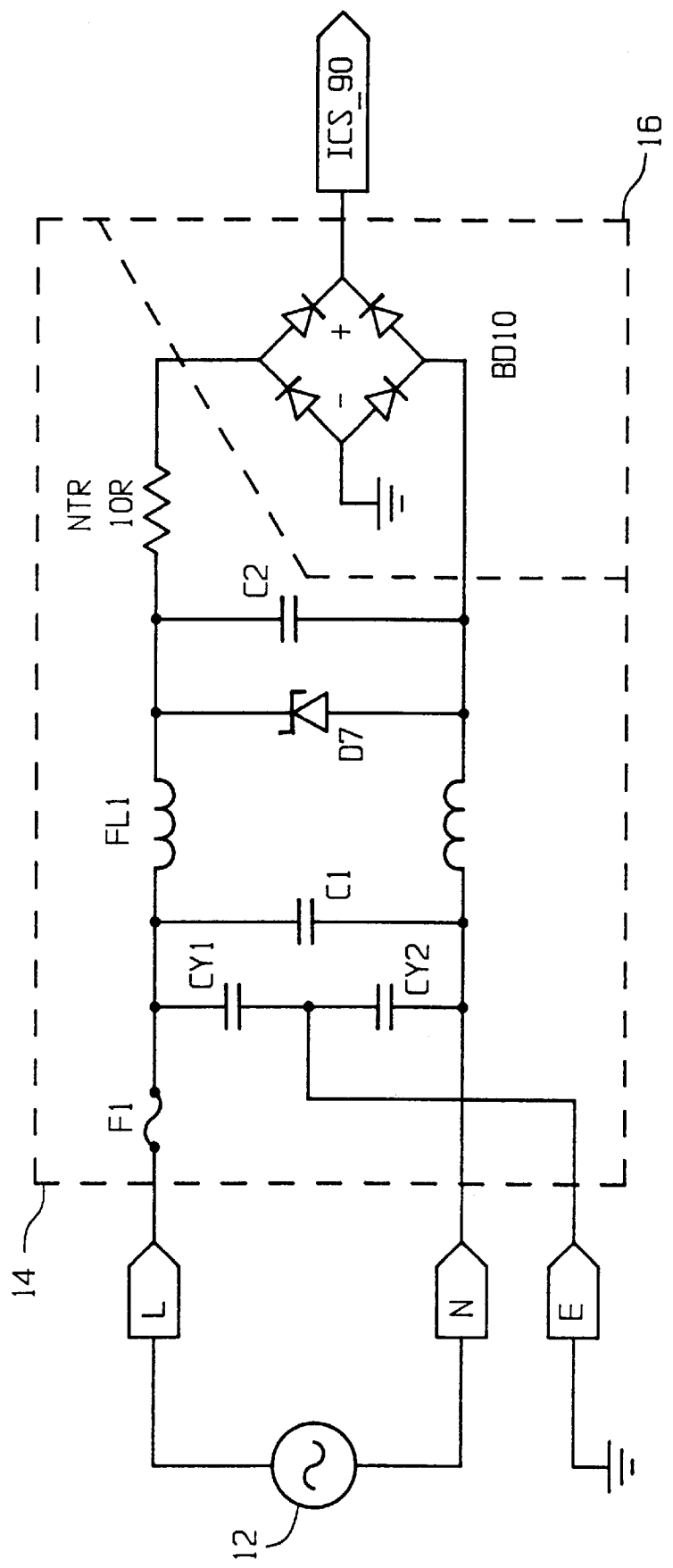
FIGS. 6A, 6B, 6C, and 6D are schematic diagrams of the switched mode battery charger circuit of FIG. 1.
Figure 6B:
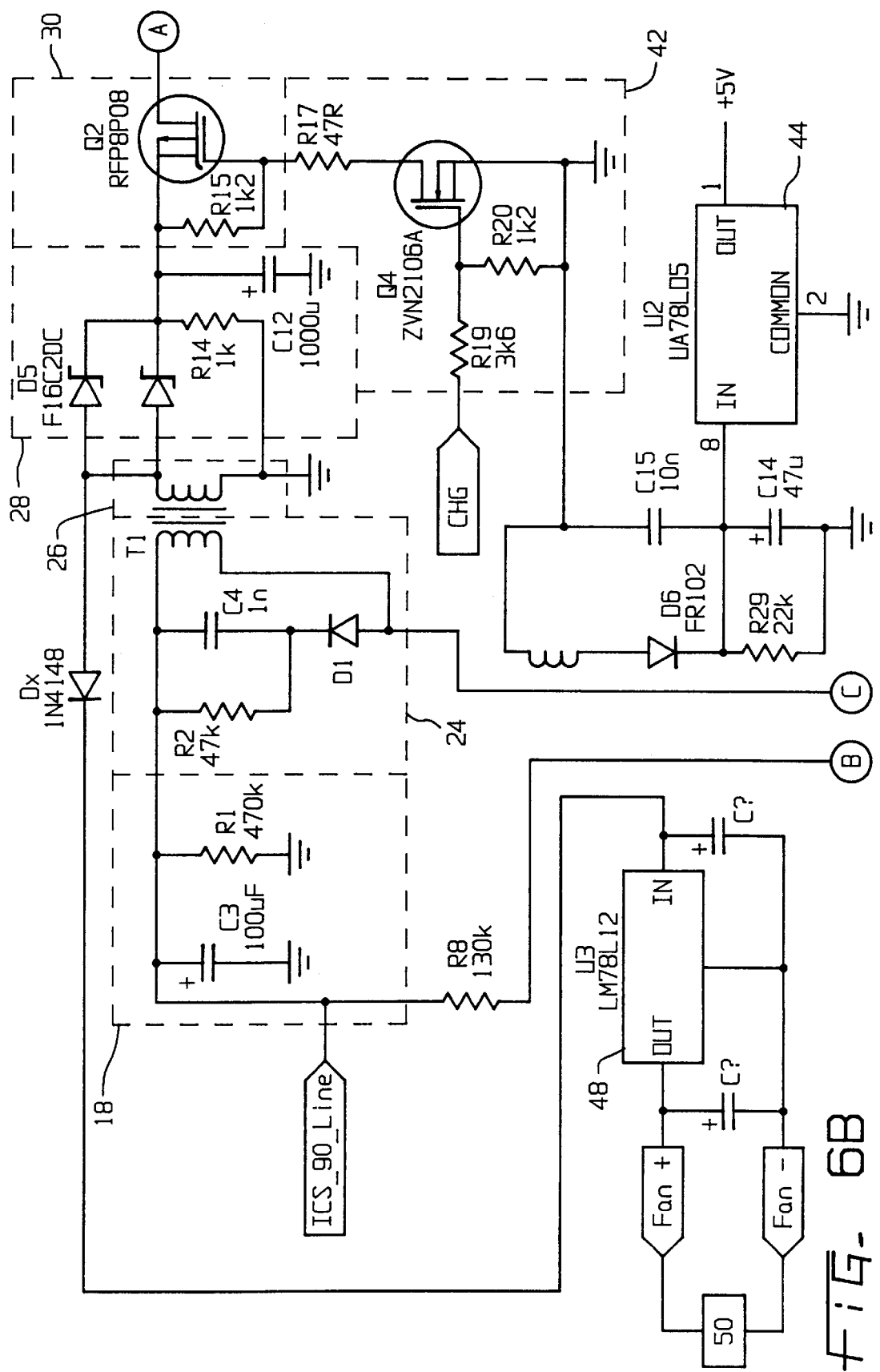
Figure 6C:
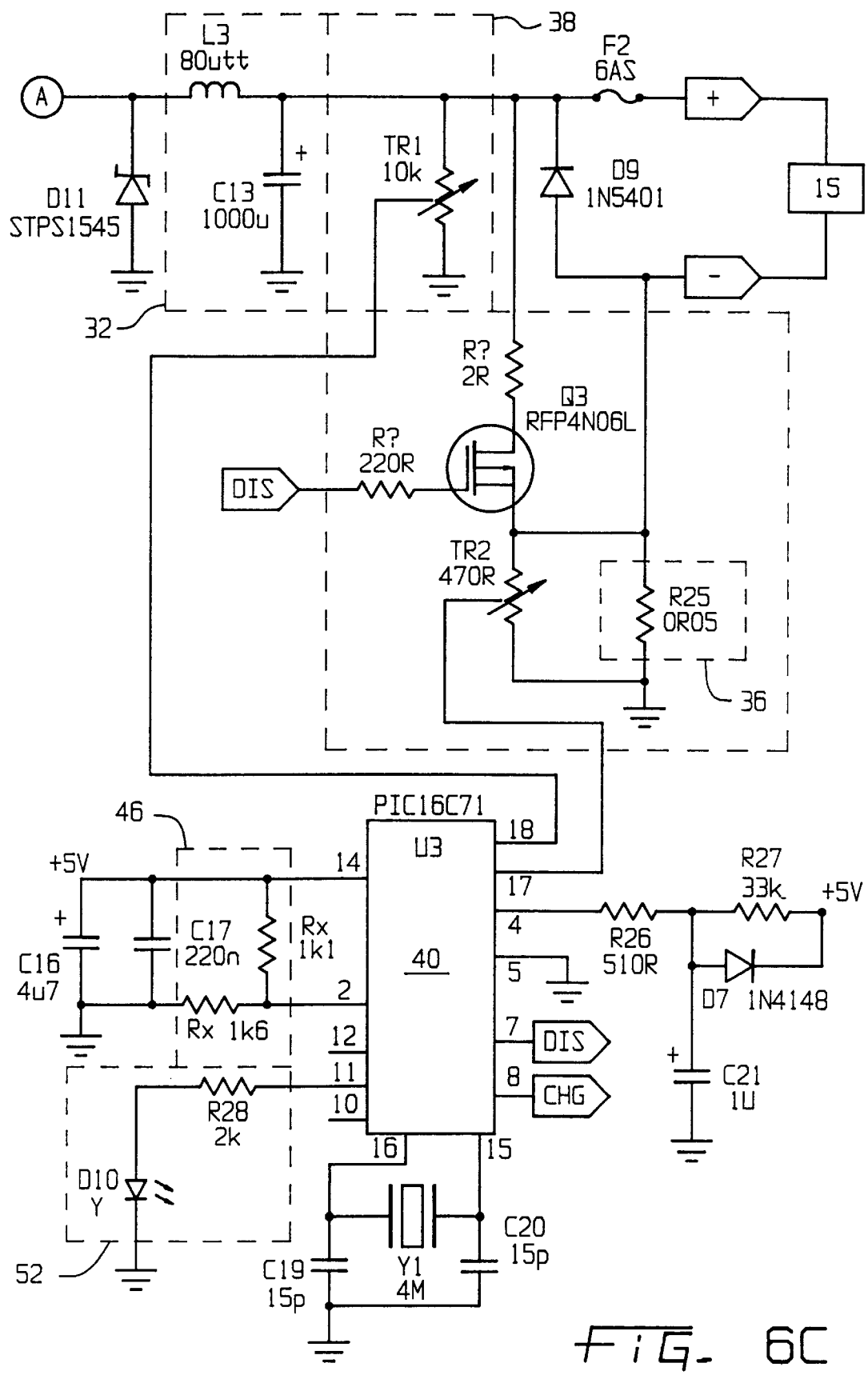
Figure 6D:
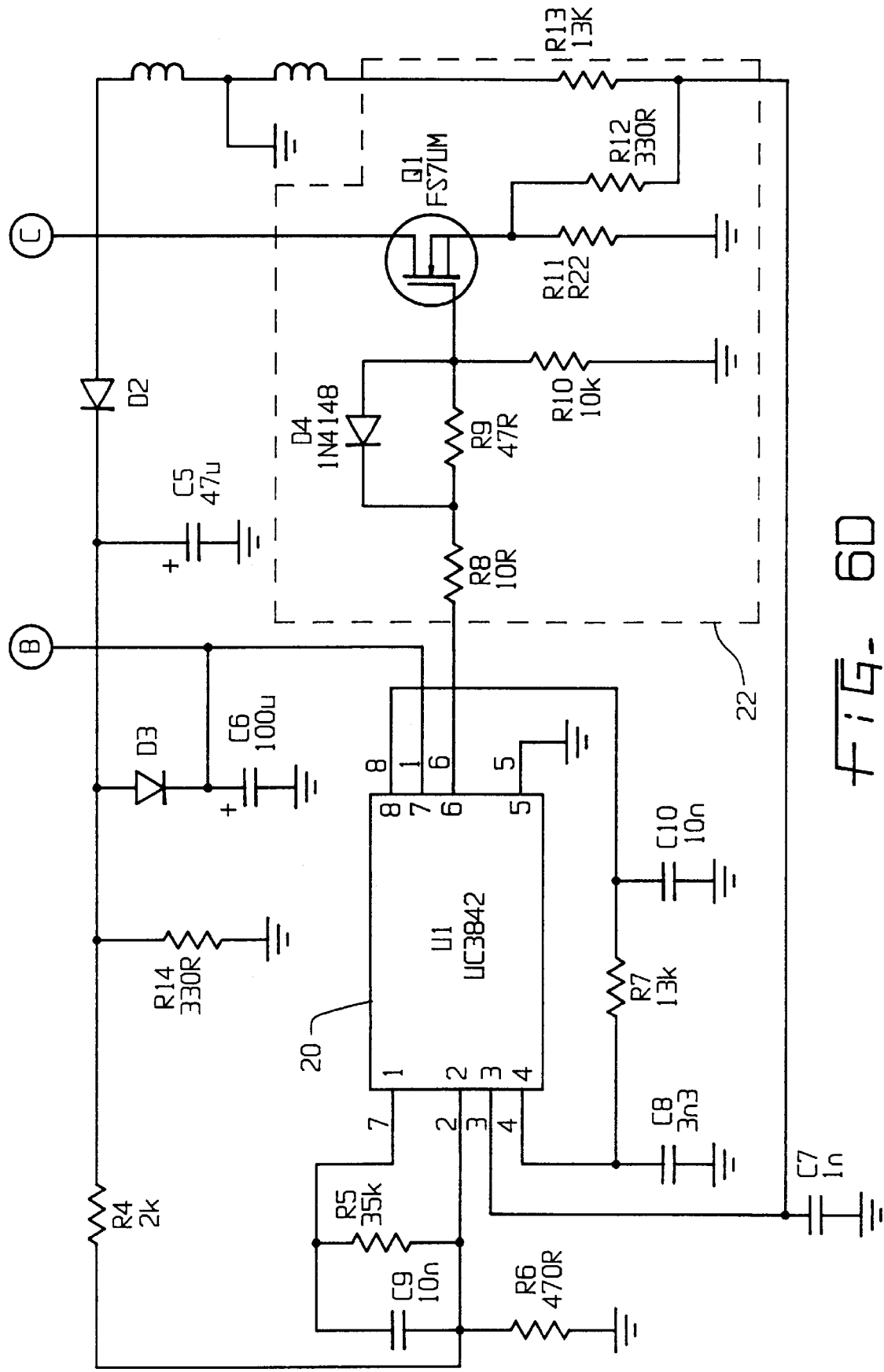

FIGS. 6A and 6B are a schematic diagram of an embodiment of switched mode battery charger 10 of the present invention with the major functions described above indicated and referenced.

As shown in FIGS. 2A through 2E, referring now to the firmware associated with the operation of battery charging circuit 10, in general, the operational steps are as follows: Upon power up, the battery charger is reset and remains operational while waiting for a battery to be connected to the battery charger. Upon sensing that a battery has been connected to the battery charger, through the sensing of a minimum rest voltage by the microprocessor, the battery is charged according to the charging sequence. After the battery has been charged, the firmware waits for the battery to be disconnected from the charger, the firmware loops back to wait for further battery connections and charging. While waiting, the circuit monitors the battery for a required minimum voltage. If no such minimum voltage is present, then the sequence is repeated. Battery removal detection is accomplished by the fact that supply will try to deliver power into an infinite impedance, i.e., the voltage goes to the limit of the supply. When the microprocessor detects an excessive voltage with no current, it determines that the battery has been disconnected. If the battery is disconnected during the charging sequence, the unit resets and waits for a battery to be connected.

FIGS. 2A to 2E illustrate flow charts of the firmware generally described above. Upon power-up the charger in the main flow of FIG. 2A first verifies that a battery has been connected to the charger. The charger then runs a self test to ensure that the power supply is functioning properly and providing an acceptable charging source. The main flow then proceeds to the profile/stage flow of FIG. 2B. The profile/stage flow proceeds through the load flow of FIG. 2C, the rest flow of FIG. 2D, the pulse flow of FIG. 2E, a post pulse rest, and a check timer. If the timer limit has not been exceeded, the profile flow returns to the load flow. If the timer limit has been exceeded, the next charging stage is initiated.

There can be, and usually are, several stages per battery profile and in some cases there can be multiple profiles. Typically, the following stages are used:

Battery wake up stage that revives a totally dead battery by pumping current for a set number of minutes.

A bulk charge which charges at a constant current until a voltage threshold is reached.

An equalizing charge which charges at a lower current until the voltage threshold is crossed again.

Finally, a float charge stage which uses a constant holding voltage with a relatively low current limit and runs for a fixed period of time.

or some combination of the above.

When the profile is complete, the charger either waits for the battery to be disconnected, or it monitors the battery voltage and waits for it to go below a restart threshold, at which point it would begin the charge cycle over again.

Microcontroller 40 uses a custom firmware/software set to build microcontroller code to charge batteries. The firmware is designed to be extremely flexible in the type of charging stages that are supportable. A custom-built software interface tells the assembler how to configure the firmware.

The top level settings for the charger are:

Maximum Run Time—Sets the absolute limit of time for charging (in minutes).

Battery Detect V—Sets the minimum voltage required before charging will begin.

Auto Restart V—Sets the low limit before a completed charge will begin again.

Start Stage—Sets which stage charging will begin with.

Absolute Voltage Limit—Sets a maximum allowable voltage for the charger.

The multiple stages can each contain the following settings:

LED Action—Allows for control of the LED to indicate what stage is presently operating.

Load Time—The amount of time (in milliseconds) that the discharge pulse is active.

Prepulse Rest Time—The amount of time (in milliseconds) between the discharge and the charge pulses.

Pulse Time—The amount of time (in milliseconds) to deliver a charging pulse.

Postpulse Rest Time—The amount of time (in milliseconds) after the charging pulse and before looping back to the discharge pulse.

Charging Current—Sets the current limit for the stage (in mA).

Charging Voltage—Sets the voltage limit for the stage (in volts per cell).

Charging Power—Sets the power limit for the stage (in mW per cell).

Time Limit—Sets a time limit (in minutes) for the stage. If the timer expires, it jumps to the stage specified by Time Limit Next Stage.

Load Voltage Limit—If this stage has a discharge pulse, a reading can be taken at the end of it. When the voltage limit is exceeded, it will jump to the stage specified by Load Voltage Limit Next Stage.

Rest Voltage Limit—If this stage has either a pre- or post-pulse rest period, a reading can be taken at the end of it. When the voltage limit is exceeded, it will jump to the stage specified by Rest Voltage Limit Next Stage.

Low Pulse Voltage Limit—If the pulse voltage is below this value, it will jump to the stage specified by Low Pulse Voltage Next Stage. This is usefull for differentiating between two voltage settings, such as 6V vs. 12V, for automatic battery detection. This setting would be used to detect a battery that is clearly a 6V. The High Pulse Voltage Limit would be used to detect a battery that is clearly a 12V while the in-between voltages would be indeterminate and more detection stages may be necessary.

High Pulse Voltage Limit—If the pulse voltage exceeds this value, it will jump to the stage specified by High Pulse Voltage Next Stage. This is useful for detecting that the present charging stage can be ended early or skipped entirely because the battery is already charged enough.

Low Current Limit—This is used when the charging stage is used to complete a charge by holding a constant voltage. In this case the current will gradually decrease as the battery becomes more charged. Once the current goes below this threshold value, it will jump to the stage specified by Low Current Limit Next Stage.

High Current Limit—This is used when the charging stage is used to complete a charge by holding a constant voltage. If the current required to meet this voltage is excessively high, then perhaps more charging needs to be done, or maybe the battery is damaged. Once the current goes above this threshold value, it will jump to the stage specified by High Current Limit Next Stage.

Each of the Next Stage settings can either specify an actual stage to jump to, or can give it one of two special values. Stage 0 (zero) is a special case that means 'done'. The last stage would typically jump to stage 0. Stage 99 (ninety-nine) is the other special case stage that means 'error'. Sometimes the Time Limit Next Stage is set to 99 when it should not take more than X number of minutes to charge a battery to a certain voltage, but if it is not finished, then there is probably something wrong with the battery or perhaps the charger.

Below is an actual example of a charger setting for charging 12V 5 A lead acid batteries:

|         | Max Run Time          |           | 90 minutes    |              |
|---------|-----------------------|-----------|---------------|--------------|
|         | Battery Detect V      |           | 6.00 V        |              |
|         | Auto Restart V        |           | not enabled   |              |
|         | Start Stage           |           | 1             |              |
|         | Absolute Voltage Limit|           | 17.00 V       |              |
| Setting | Stage 1               | Stage 2   | Stage 3       | Stage 4      |
| LED Action | Blink              | Blink     | Blink         | Steady On    |
| Load Time | 2 ms                | 0 ms      | 0 ms          | 0 ms         |
| Prepulse Rest Time | 0 ms       | 0 ms      | 0 ms          | 0 ms         |
| Pulse Time | 100 ms             | 100 ms    | 100 ms        | 100 ms       |
| Postpulse Rest Time | 1 00 ms   | 0 ms      | 0 ms          | 0 ms         |
| Charging Current | 5.0 A        | 6.0 A     | 2.0 A         | 1.0 A        |
| Time Limit/Next | 3 min/#2      | 60 min/#3 | 60 min/#4     | 60 min/#0(done) |
| Load V Limit/next | no limit    | no limit  | no limit      | no limit     |
| Rest V Limit/next | no limit    | no limit  | no limit      | no limit     |
| Pulse V Limit/next | no limit   | 15.5 V/#3 | 15.5 V/#4     | 13.8 V regluate |
| Low Current Limit/next | no limit | no limit | no limit     | no limit     |

Collectively, these charging stages are referred to as the charging profile for this particular battery type.

Figure 3A:
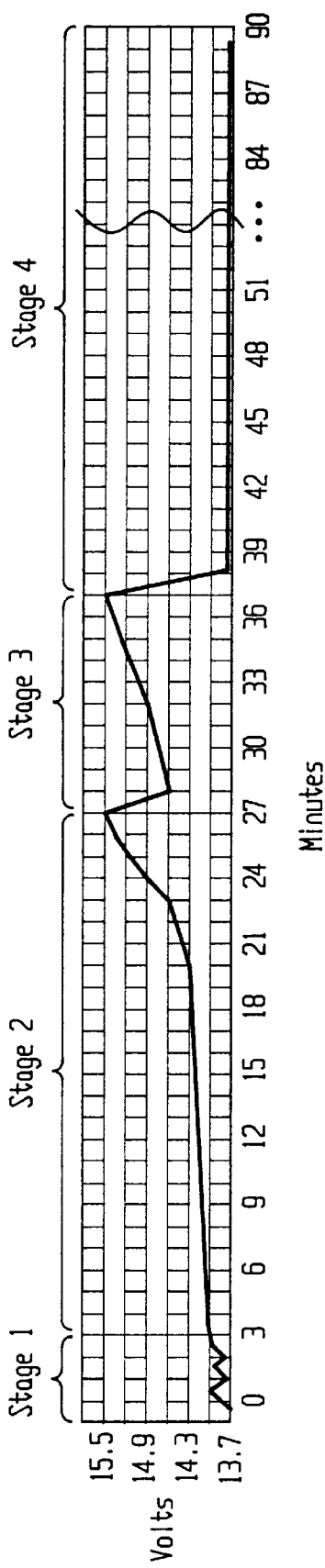
FIG. 3A is the charge voltage stage timing chart illustrating a typical charging profile or sequence of stages for battery chargers associated with the battery charger diagram of FIG. 1.
Figure 3B:
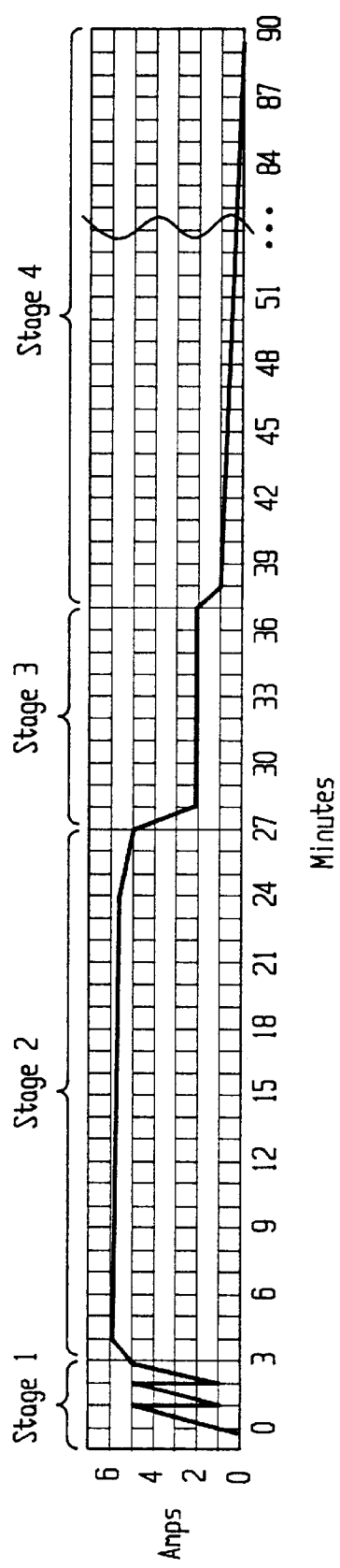
FIG. 3B is the charge current stage timing chart for the charge voltage timing chart of FIG. 3A.

FIGS. 3A and 3B illustrate a typical charging curve for the above settings. Stage #1 runs with pulsing current until 3 minutes elapse. Stage #2 runs with a current of 6.0 A for a maximum of 60 minutes, but after 24 minutes the voltage threshold of 15.5 V is reached. Stage #3 runs with a current of 2.0 A for a maximum of 60 minutes, but after 10 minutes the voltage threshold of 15.5 V is reached again. Stage #4 runs with a maximum current of 1.0 A and a maximum voltage of 13.8 V which it could hold for 60 minutes, but it is pre-empted by the master maximum run time of 90 minutes, so it only ran for 53 minutes.

Figures 2A, 2B:
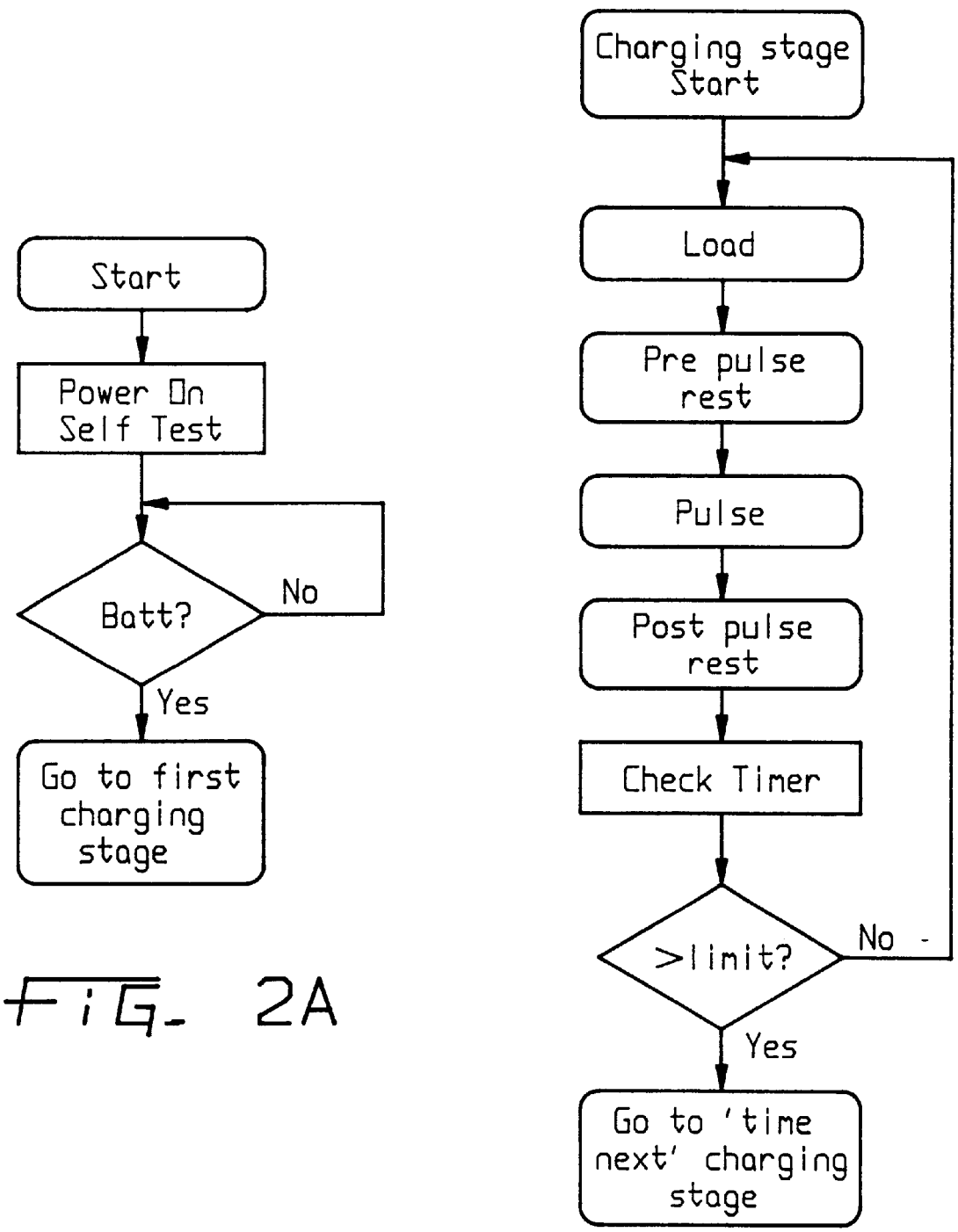
FIG. 2A is a flow chart illustrating the charge initialization process for the battery charger firmware associated with the battery charger diagram of FIG. 1.
FIG. 2B is a flow chart illustrating the stage flow for battery charger firmware associated with the battery charger diagram of FIG. 1.
Figures 2C, 2D:
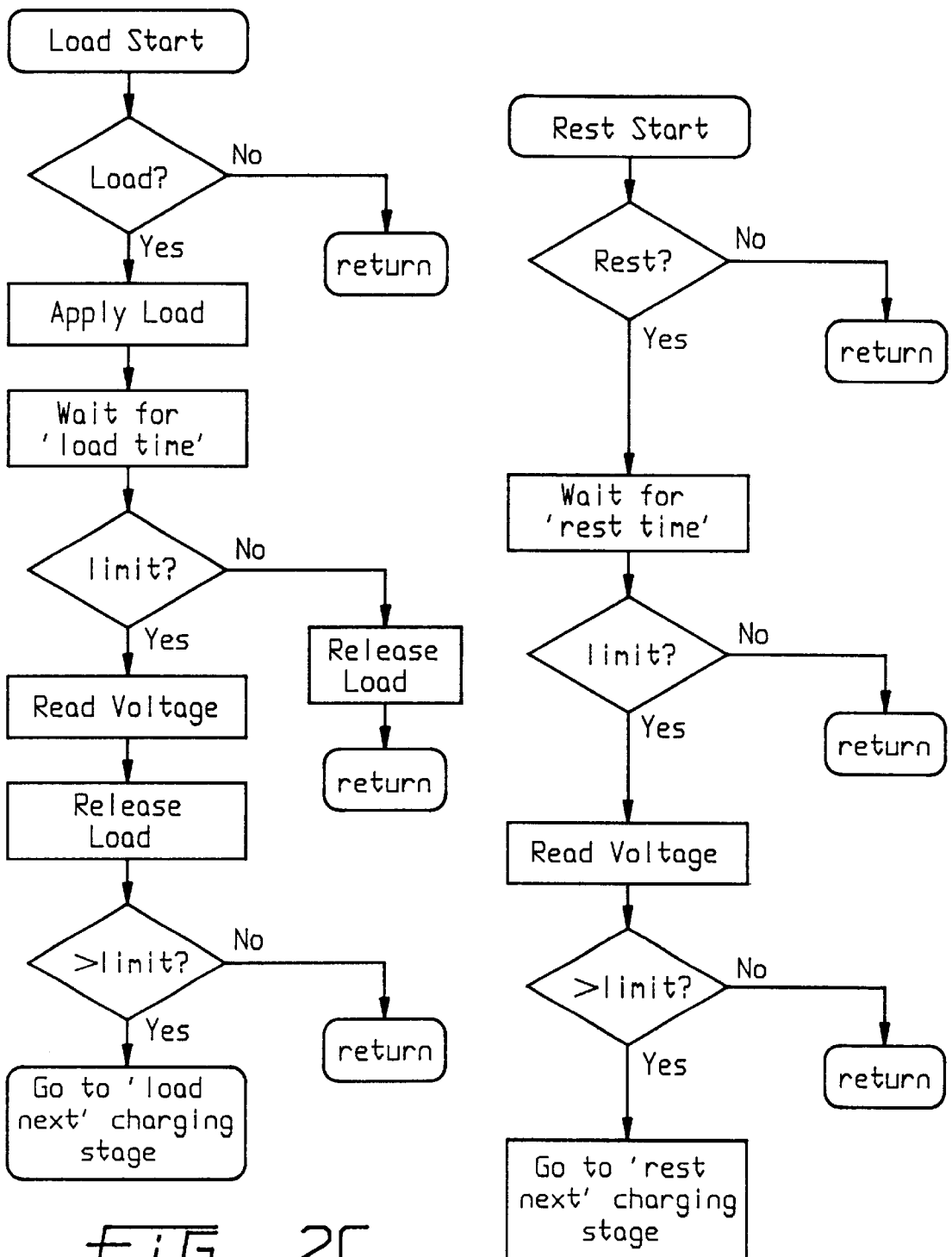
FIG. 2C is a flow chart illustrating the load flow for the stage flow of FIG. 2B.
FIG. 2D is a flow chart illustrating the rest flow for the stage flow of FIG. 2B.
Figure 2E:
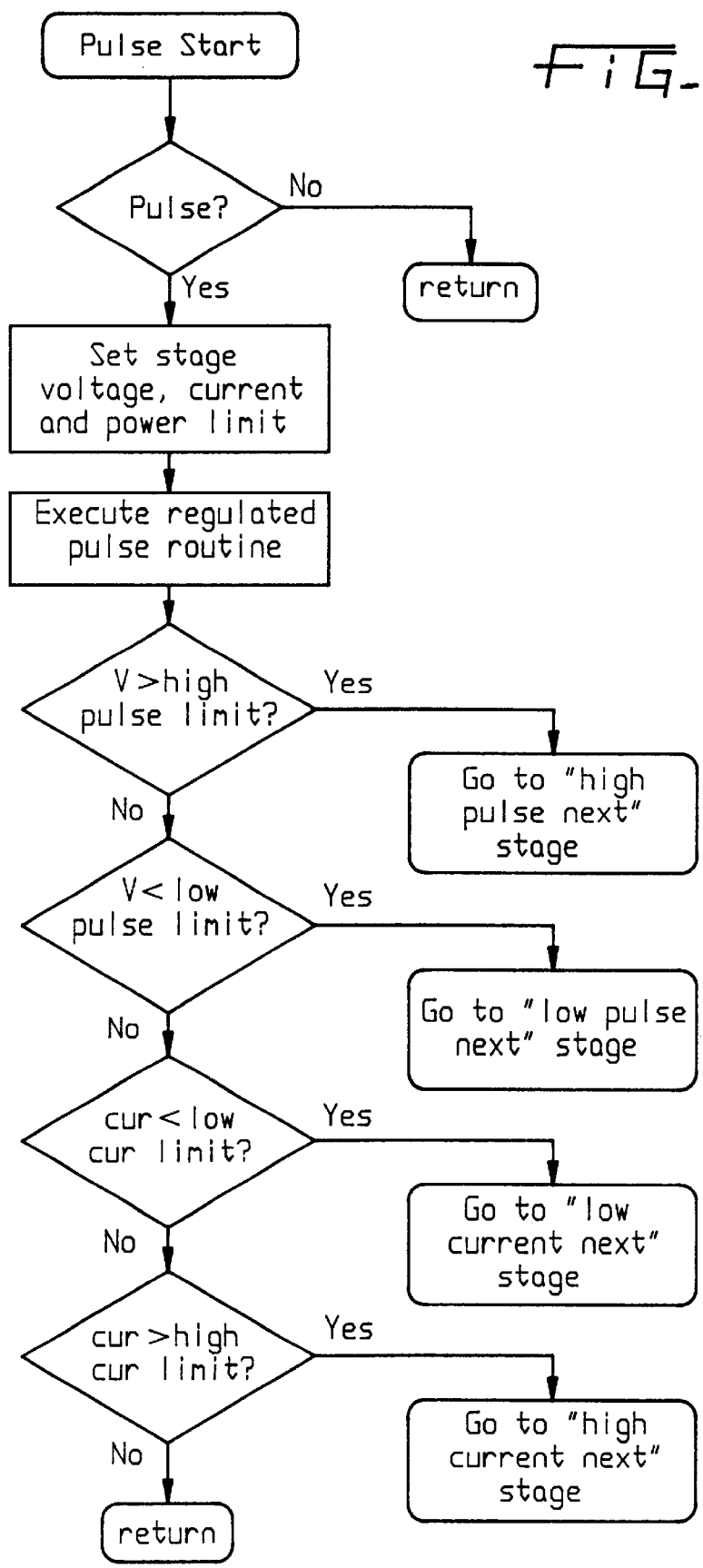
FIG. 2E is a flow chart illustrating the pulse flow for the stage flow of FIG. 2B.

The pulse flow in FIG. 2E includes the step of executing regulated pulse routine which controls the output of switched mode battery charger 10. This routine utilizes Pulse Width Modulation (PWM), a method of controlling/limiting/regulating the total output of a power supply. This method works by switching the power on and off at a fixed frequency, but with a variable duty cycle. The longer the on time is versus the off time, the higher the output of the power supply. Ordinarily, the PWM function is controlled by a specialized chip. By supplying the chip a reference regulation value and a feedback line from the output of the supply, the chip generated the appropriate waveforms.

However, the present invention required the ability to choose, at run time, what regulated voltage or current to use. One method of achieving this would be to use a specialized chip and have a controlled reference. Instead, the present invention actually produces the high-frequency waveform in firmware (ROM-based microcontroller software).

As shown in FIG. 1, microcontroller 40 operates at 4 MHz and needs an output frequency of 20 KHz. Due to the microcontroller's design, the actual time it takes to execute most instructions is 1 μs (4 MHz/4=1 MHz, 1/1 MHz=1 μs). Some instructions take 2 μs. Based on the desired output frequency, the calculation of the total number of "normal" instructions that can be executed during a single waveform is 50. (1/20 KHz=50 μs, 50 μs/1 μs/instr=50 instr).

Therefore, only 51 possible states exist for the waveform. (ie. 0 μs on/50 μs off, 1 μs on/49 μs off, 2 μs on/48 μs off, ..., 49 μs on/1 μs off, 50 μs on/0 μs off). With only 51 actual states, this yields a fairly course control on the power supply. This is made even worse by the fact that most power supplies respond non-linearly, yielding fine control for some parts of their range but extremely course control for other parts.

In the present invention as shown in FIGS. 5A, 5B, 5C, and 5D, a software interleave was used to simulate the increased resolution of the PWM and thereby providing a finer control of the power supply. For example, if 2 μs on/48 μs off was insufficient, and 3 μs on/47 μs off was excessive, toggling between the two settings could provide the correct output. The present invention actually uses a double interleave, yielding nearly four times as many states of the PWM as the original 51. (50×4+1=201).

The 0 state would, obviously, be 0 μs on/50 μs off all the time. The 1 state would be 0 μs on/50 μs for 3 out of 4 waveforms, but the fourth would have a 1 μs on time/49 μs off. State 2 would be 0 μs on/50 μs for half the waveforms, but every other one would be a 1 μs on time/49 μs off. State 3 would be 0 μs on/50 μs off for 1 out of 4 waveforms, but the other three would be 1 μs on time/49 μs off. State 4 would be just 1 μs on/49 μs off all the time. State 5 would be 1 μs on/49 μs for 3 out of 4 waveforms, but the fourth would have a 2 μs on time/48 μs off. Table I is a full listing of all the different states and their waveform times and effective output percentages. Software interleaving is done to give better effective resolution than is normally available. The actual resolution is 1.0 μs, but with software interleaving an effective resolution of 250 μs resolution is achieved.

Additionally, it is advantageous to take the measurements required to regulate the supply during the actual waveform generation. Since this is to be done by microcontroller 40, the measurement code has to be carefully woven into the waveform generation code.

The interleaving introduces slight instability in the output, which is advantageous to obtaining a higher resolution reading from it. If one hundred readings are taken from a completely stable source, the result is a total reading that is exactly divisible by 100. However, slight errors, noise, and, in the present interleaved PWM firmware, add the "noise" needed to obtain a higher resolution reading. For example, if the actual voltage is exactly in the middle of one A/D result point, noise would randomly add some pluses and minuses. However, in theory, the pluses and minuses should be balanced, and therefore cancel when the average is calculated. If the actual voltage is on the high side of one A/D result point, noise would more often add pluses than minuses.

Figure 7A:
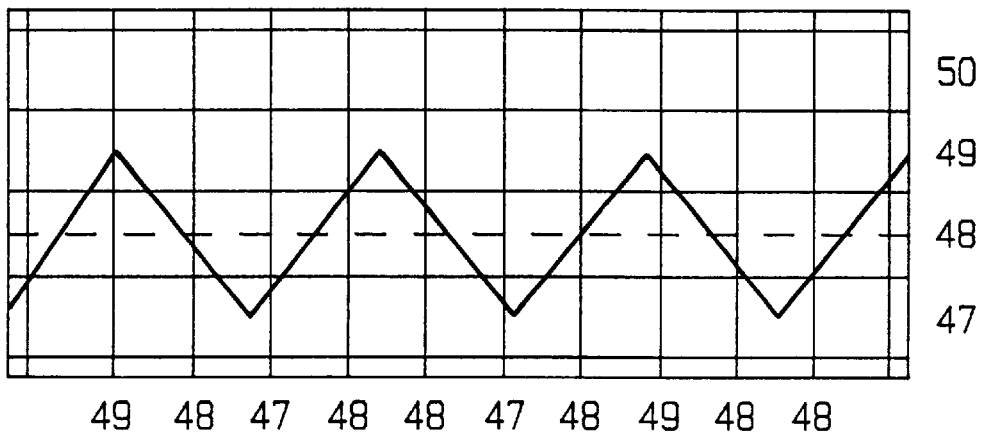
FIG. 7A is a graph of a waveform that represents a reading of 48.0 with balanced noise added.
Figure 7B:
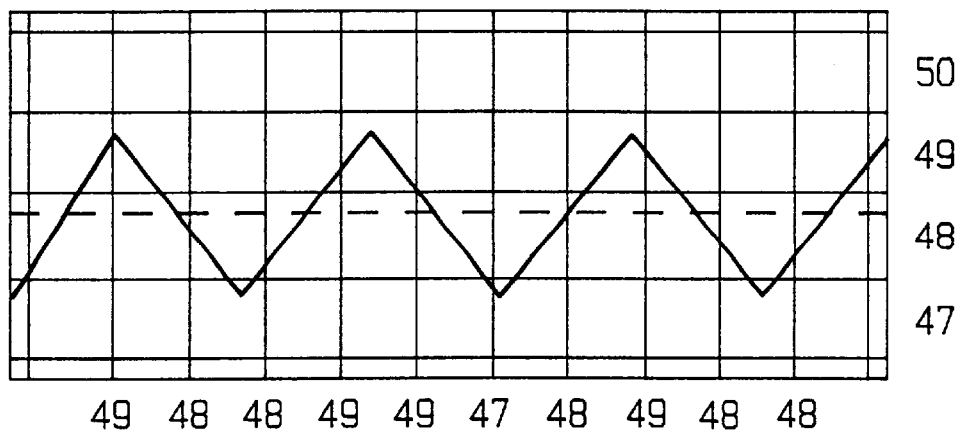
FIG. 7B is a graph of a waveform that represents a reading of 48.3 with balanced noise added.
Figure 8:
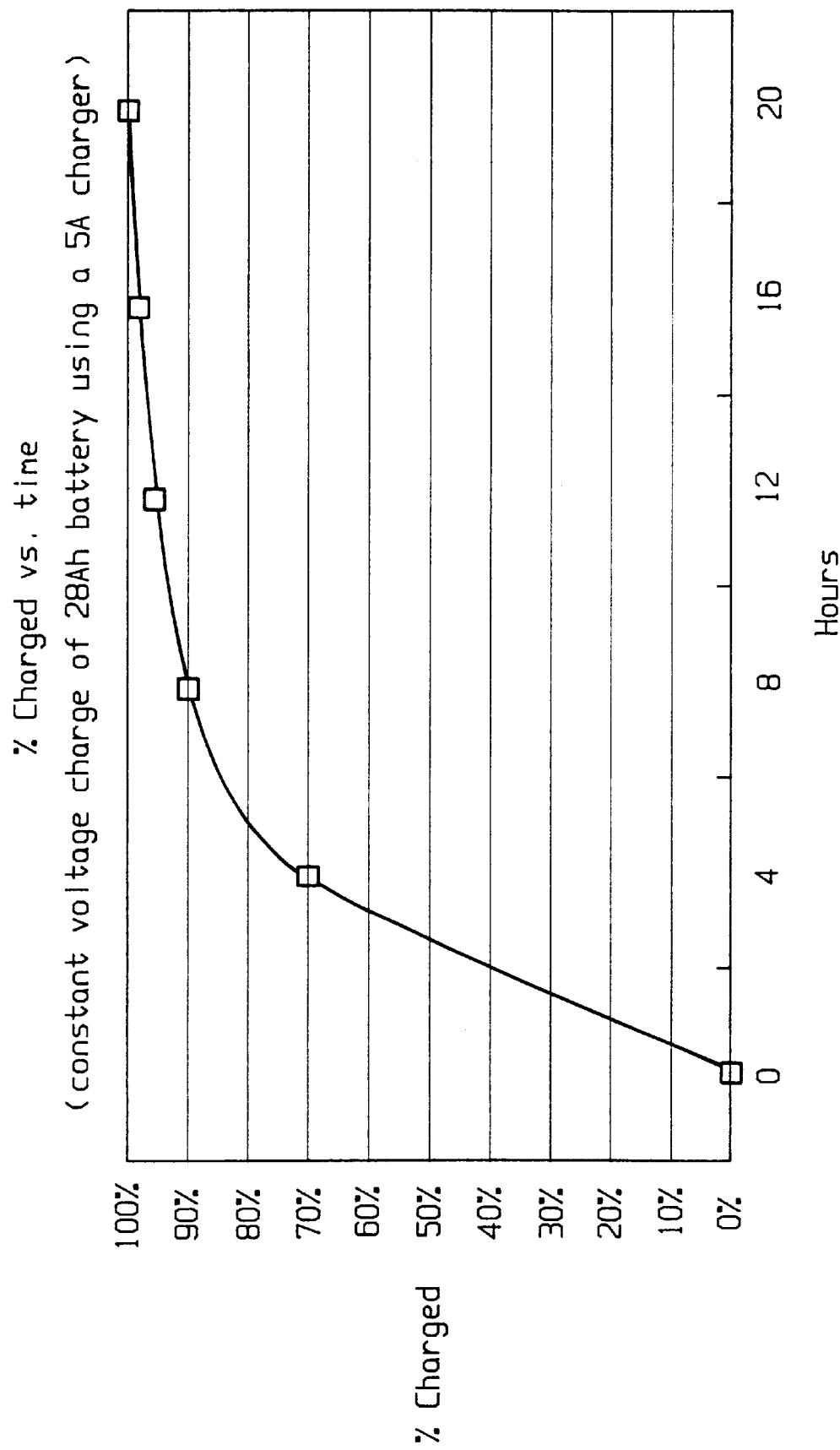
FIG. 8 is a graph of percentage charge versus time of a 28Ahr battery charged using a 5A and 5B constant voltage charger.

FIGS. 7A and 7B illustrate graphs of waveforms with balanced noise added. Both graphs show a dotted line indicating the actual average value and waveform that represents the reading with balanced noise added. Readings are taken at the vertical lines and the horizontal lines represent the boundaries between A/D values. FIG. 7A shows a balanced noise waveform exactly on the middle of the 48 A/D point. FIG. 7B shows that same waveform shifted up by one quarter. Below the graphs are the A/D values taken at the various time points, and then a total and an average value. Without the balanced noise, both waveforms would have ended up with average values of exactly 48.0. The present invention adds some degree of balanced noise by the fact that it uses an interleaved PWM design to obtain a higher resolution value than would have been possible with a single A/D measurement or with multiple A/D measurements on a completely stable voltage source.

As an added complication, interrupts have to be disabled during the output waveform generation, therefore the PWM code must maintain the timer itself. To accomplish this the Global Interrupt Enable is turned off, the Timer Interrupt Enable is left on. This causes the Timer Interrupt Flag (TIF) to go high when the internal free running timer rolls over. Because of the prescaler setting used, this would happen every 16,384 µs (1 µs×64 for the prescaler×256 for the internal free running timer). Every time the Timer Interrupt Flag is raised, the firmware knows that another 16,384 µs has elapsed. The firmware then updates its counters, resets the Timer Interrupt Flag and generates some more waveforms. Even if the firmware is late in recognizing that the TIF had been raised, the error is not accumulative. The timer continues to run. The only caveat is that the firmware must recognize the TIF being raised before the timer rolls over again after another 16,384 µs.

Although the actual regulation decisions (more power/less power) could, in theory, be rolled into the waveform generation code, it was decided to not do this. This means that every 16 ms the power supply goes offline for moment while the decisions are made. This does not seem to adversely affect the present application, which is battery charging, however, this would not be acceptable in a situation where the supply is powering an active load. Even the fact that regulation decisions are only made once every 16 ms is problematic for a conventional power supply, but for charging a battery this is quite adequate. Additional protection would also be required if the PWM output were directly driving the flyback converter's MOSFET 22 which would eliminate the need for the Primary side PWM controller 20, the secondary side MOSFET 30 and its driver 42. These problems are easily fixed by rolling the regulation decisions into the code and by making the regulation decisions more often and being able to more aggressively scale back the output. Also, this code could easily be made into a 100 KHZ version by using a 20 MHz version of the microcontroller. (20 MHz/4 MHz=5, 5×20 KHz=100 KHZ). This change would necessitate changes in the measurement code since A/D conversion doesn't complete much faster in the 20 MHz version.

Additionally, both current and voltage measurements are made during the actual PWM generation. Since there is time for it, several readings are taken. This improves stability and noise immunity of the power supply regulation. In this particular example, 256 current measurements are taken along with 64 voltage measurements. With so many measurements and a slight bit of noise, slightly better resolution can be obtained than would be normally afforded which is a benefit, especially on the current, since the current is measured indirectly by measuring the voltage drop across a fixed low resistance "shunt" resistor. The smaller the resistance on this shunt resistor, the less it affects the power supply, the less power is wasted, the smaller/cheaper the shunt can be. However, lowering the resistance, lowers the voltage produced by the same current. Soon microcontroller 40 reaches its analog-to-digital converter resolution limit.

Figure 5A:
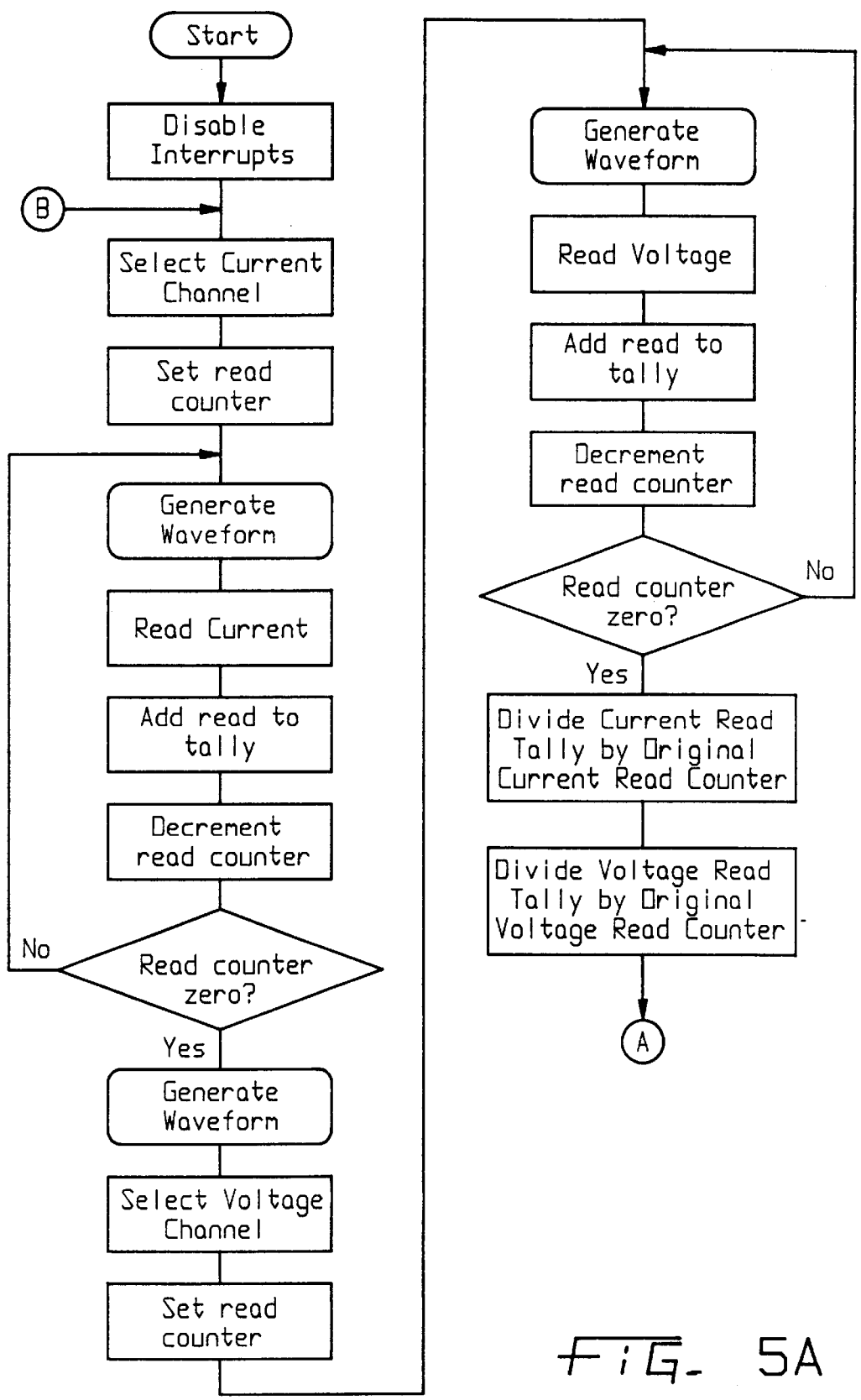
FIGS. 5A and 5B are flow charts of the main software interleaved PWM loop.
Figure 5B:
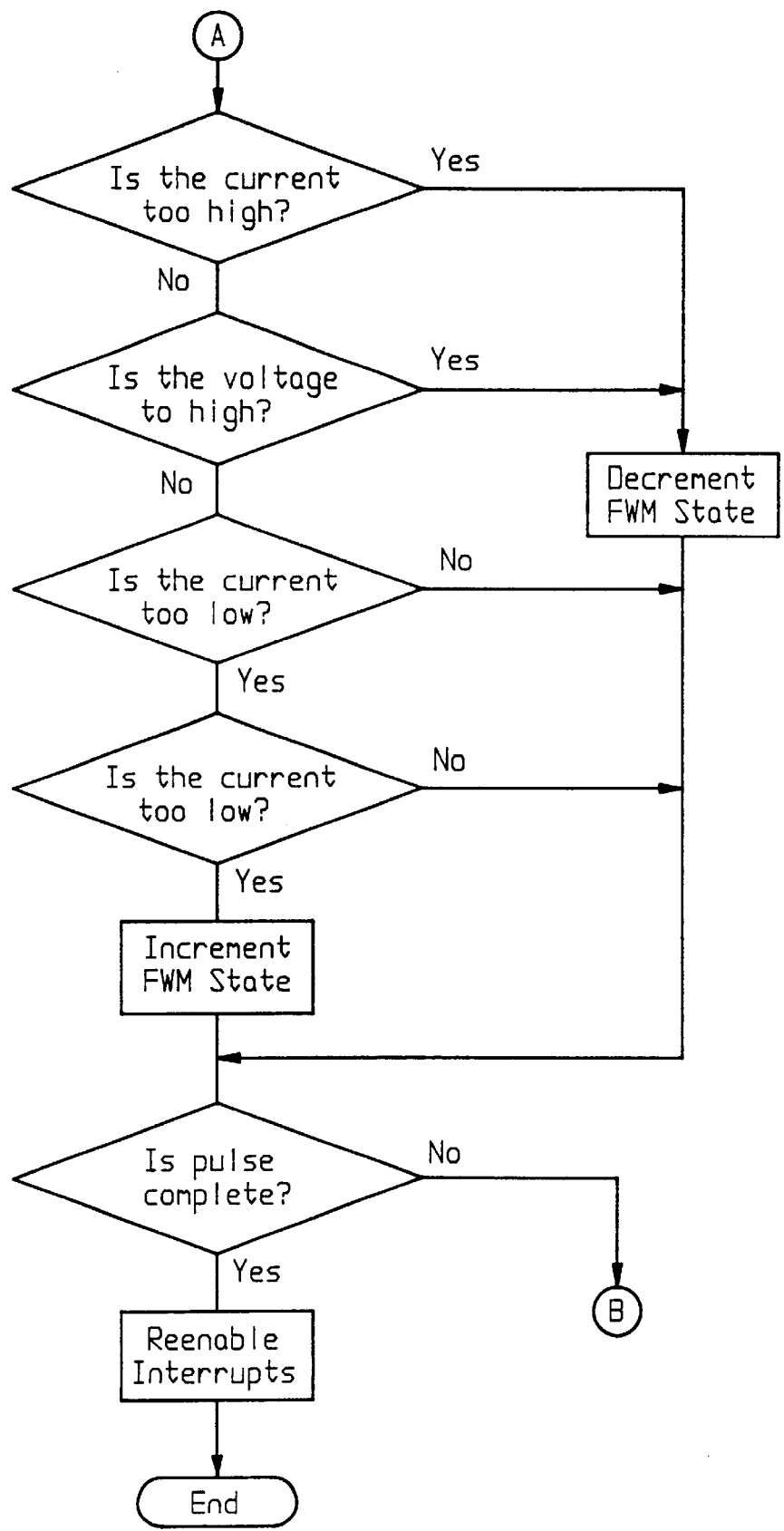
Figure 5C:
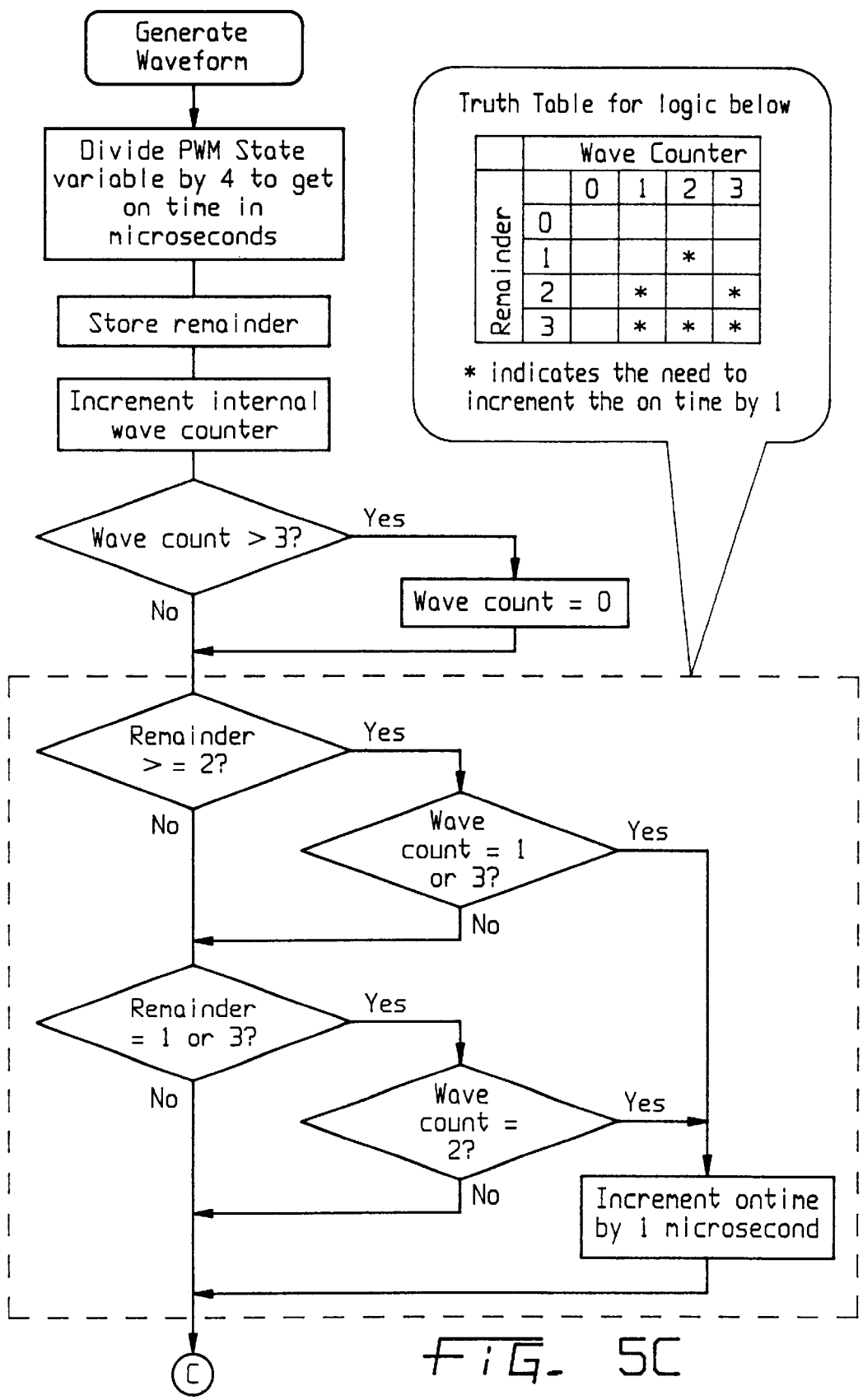
FIGS. 5C and 5D are flow charts of the waveform generation code.
Figure 5D:
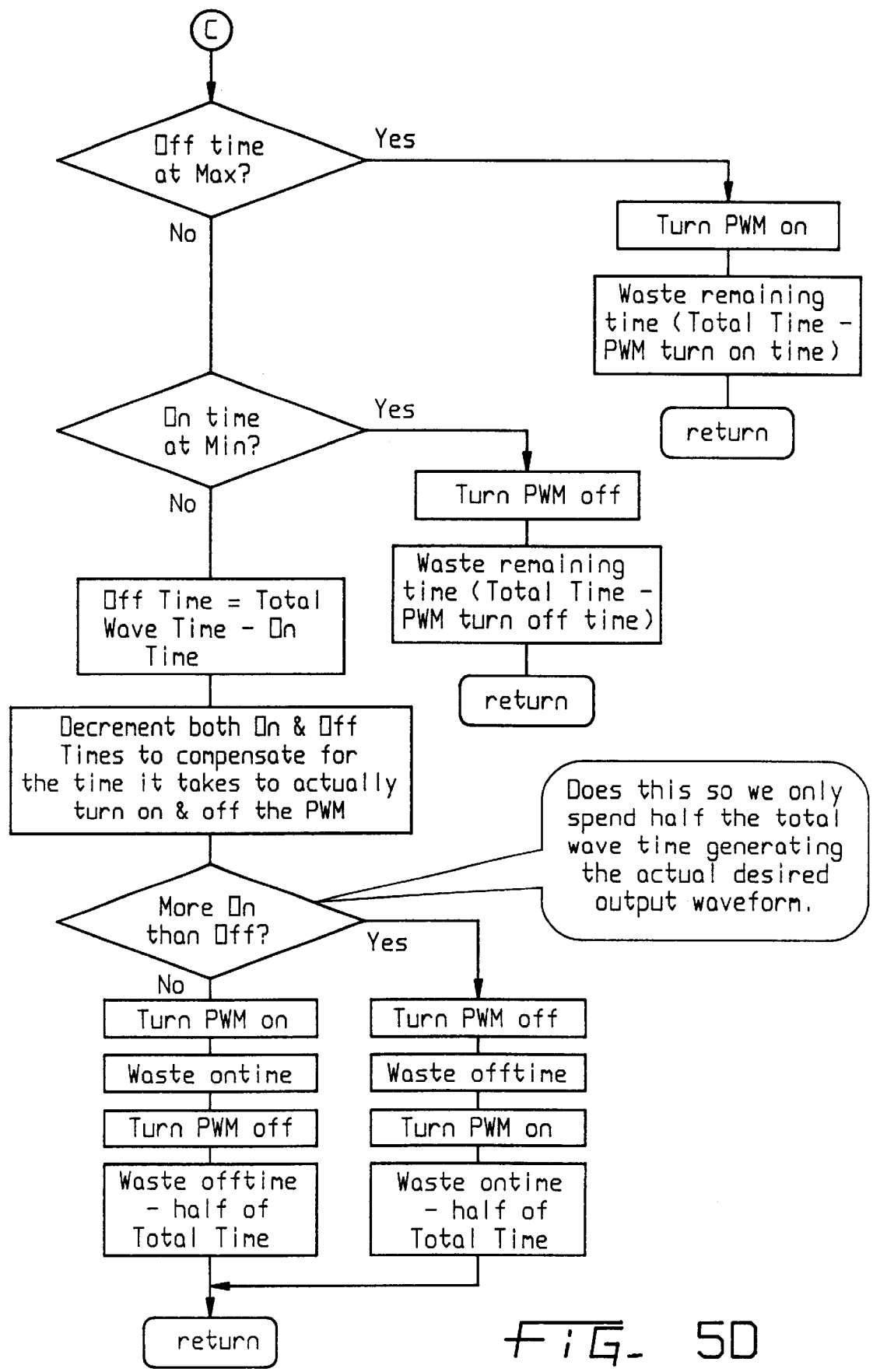

FIGS. 5A, 5B, 5C, and 5D illustrate the steps of the execute regulated pulse routine of FIG. 2E. FIGS. 5A and 5B show the steps for the software interleaved PWM loop and FIGS. 5C and 5D show the steps for the waveform generation code.

As shown in FIGS. 5A and 5B, the software interleaved PWM loop begins by disabling the interrupts and selecting the current channel of analog-to-digital converter of microcontroller 40. The counter is set to 256, then 256 waveforms are generated and 256 current readings are taken and tallied. Upon completion of the current readings, another waveform is generated and the analog-to-digital converter's voltage channel of microcontroller 40 is set The counter is set to 64, then 64 waveforms are generated and 64 voltage readings are taken and tallied. The current and voltage read tallies are divided by 256 and 64, respectively, to obtain average current and voltage readings. If the current or voltage is too high, the PWM state is decremented. If both the current and voltage are too low, the PWM state is incremented. If the pulse routine is not complete, the loop begins again at the step of selecting the current channel.

The waveforms for the software interleaved PWM loop are generated according to the flow chart in FIGS. 5C and 5D. Waveform generation begins by dividing the PWM state by four to get the on time in microseconds with the remainder stored. Next the internal wave counter is incremented, and if the wave count is greater than three, the wave counter is set to zero. If the remainder is one and the wave counter is two, the remainder is two and the wave counter is one or three, or the remainder is three and the wave counter is one, two, or three, the on time is incremented by one microsecond. If the on time is at the maximum, the PWM is turned on and the remaining time wasted. If the on time is at a minimum, the PWM is turned off and the remaining time wasted. The total off time is calculated by subtracting the on time from 50 microseconds. Both the on time and off time are decremented by the time to actually turn the PWM on and off. If the on time is greater than the off time, the PWM is turned off, the off time is wasted, the PWM is turned on, and the on time minus 25 microseconds is wasted. If the off time is greater than the on time, the PWM is turned on, the on time is wasted, the PWM is turned off, and the off time minus 25 microseconds is wasted.

Figure 4A:
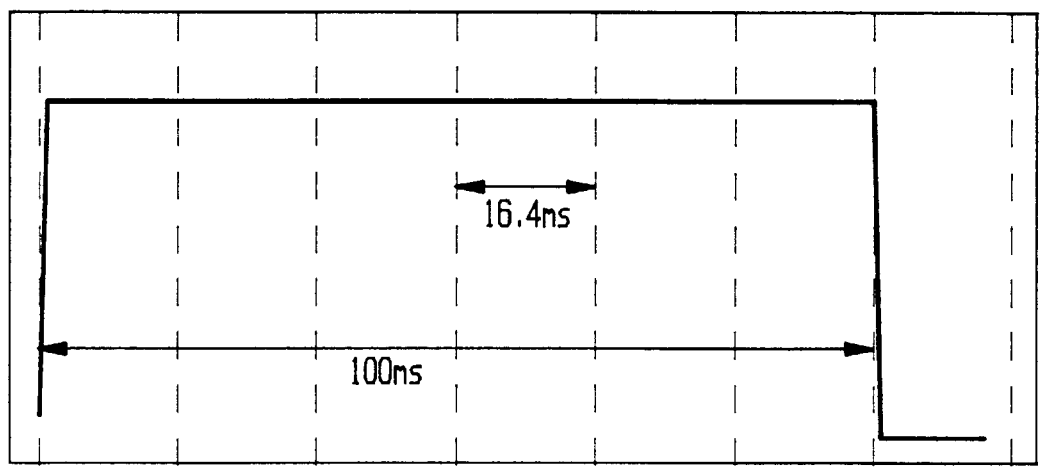
FIG. 4A is a timing diagram for the microcontroller code illustrating a 100 ms section of the code.
Figure 4B:
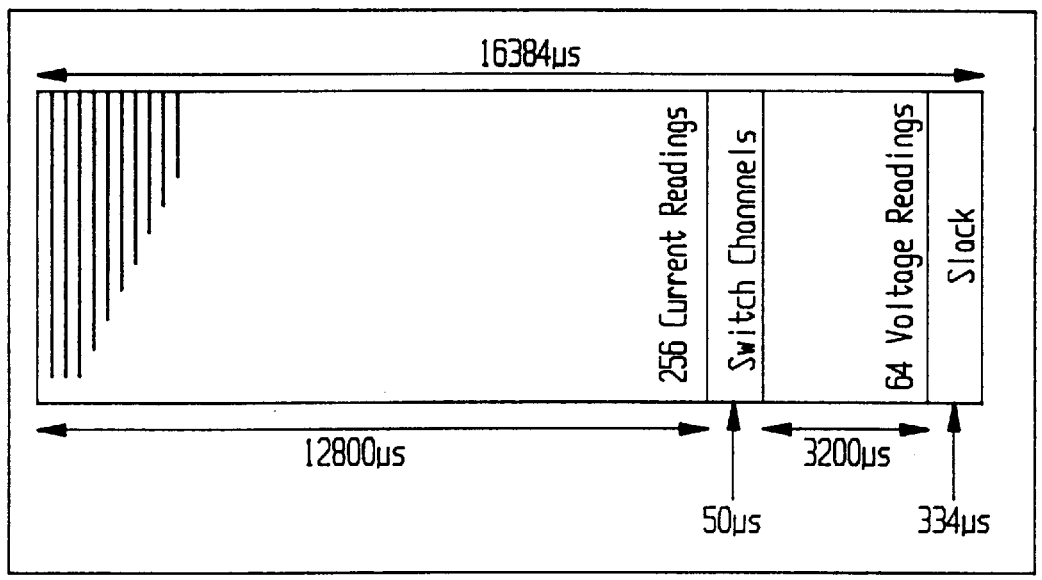
FIG. 4B is a timing diagram for the microcontroller code illustrating a 16 ms section of the 100 ms section of the code of FIG. 4A.

FIGS. 4A to 4D illustrate waveform timing diagrams of the microcontroller code. In FIG. 4A a 100 ms section of the microcontroller code shows charge pulses broken up into 16384 µs segments. (6×16384 µs=98304 µs, approximately 100 ms) After each 16 ms segment, decisions are made about whether to increase or decrease on time based on current and voltage readings vs. limits. Each 16 ms segment is divided up into 50 µs periods as shown in FIG. 4B, which provides the 20 kHz. During the 16 ms segment, measurements are made. First 256 current measurements are made, then channels are switched, and 64 voltage measurements are taken. Then wait for the timer to expire, telling us that 16384 µs have gone by.

Figure 4C:
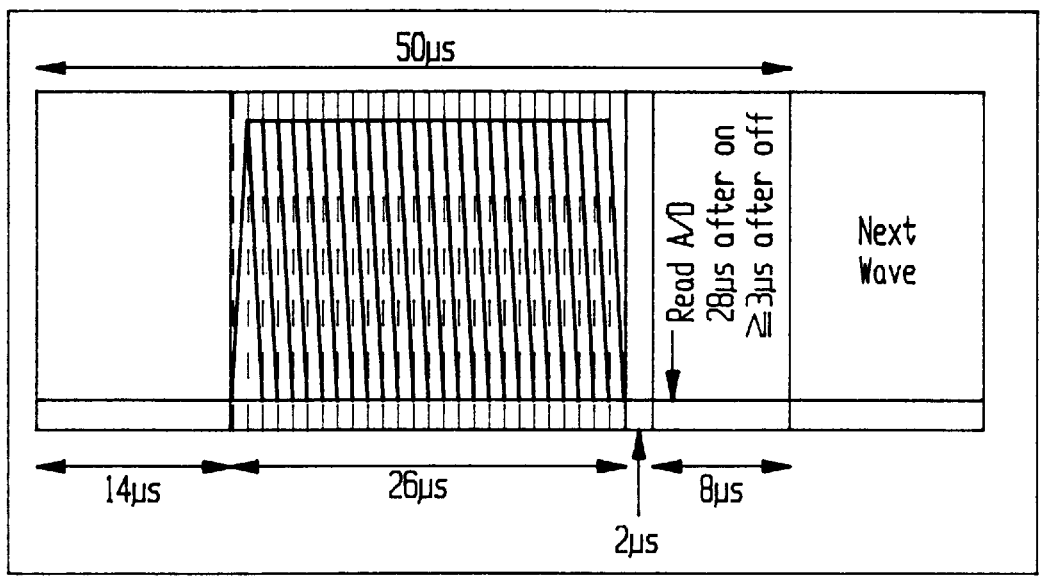
FIG. 4C is a timing diagram for the microcontroller illustrating a 50 $\mu$s is section of the 16 ms section of FIG. 4B, when the ON time of the power supply is less than the OFF time.
Figure 4D:
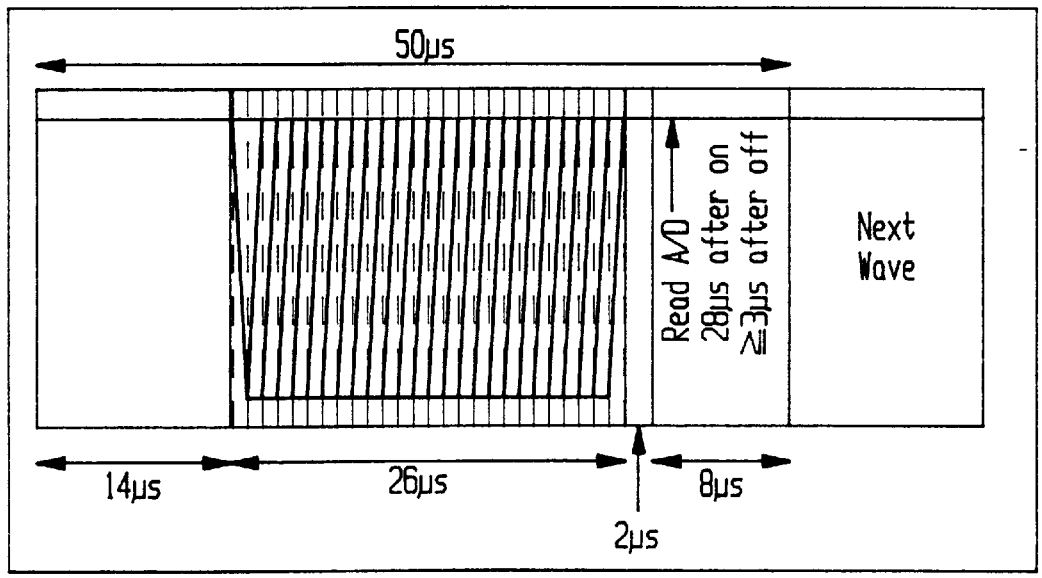
FIG. 4D is a timing diagram for the microprocessor illustrating a 50 $\mu$s section of the 16 ms section of FIG. 4B, when the ON time of the power supply is greater than the OFF time.

In each 50 µs period, 42 out of 50 µs are used to generate the actual waveform. The remaining 8 µs are used to perform the reading and to add to the totals or to switch channels or wait for the timer expire flag. If the power supply on time is less than 25 µs (50%) as shown in FIG. 4C, the waveform is normally off and the variable switching code turns the output on then off. At 25 µs and up as shown in FIG. 4D, the waveform is normally on and the wave is turned off, then back on.

The switched mode battery charger of the present invention permits a user or technician to selectively reconfigure the firmware according to a particular application. Various automatic selection devices may be incorporated in the switched mode battery charger to achieve this result as well. Sensing stages can also be used for this purpose. This permits a variety of batteries with different amp-hr ratings to be charged by a single charger.

The switched mode battery charger of the present invention is intended for use with many types of batteries, including, for example, lead, nickel, cadmium, zinc, and lithium based batteries. Such rechargeable batteries may be for use with a wide range of products and in a vast array of diverse applications, such as motorized devices (i.e., cars, trucks, bicycles, golf carts, toys), cellular phones, computers, communications equipment, recorders, military applications (i.e., aircraft, tanks, submarines, ships, etc.), heavy industrial equipment (i.e., forklifts), etc. Virtually any kind of electronic product that requires a renewable source of portable power. The battery charger of the present invention may be configured in any of a wide range of values, from 0–500 volts and from 0–1000 amps depending upon the application. It is further intended that certain other features may be added to the switched mode battery charger to enhance overall performance and user/operator interface. One such feature is an LCD display and accompanying firmware which would allow selection of the battery type and give indication as to the type of battery being charged, the charge level attained by the battery, duration of charge, charge period remaining/elapsed, battery temperature, etc.

Certain safety routines are provided to protect the battery being charged from becoming damaged. If the circuit detects, by taking two voltage measurements of the battery at a predetermined time interval, that the voltage level of the battery has ramped up too rapidly, then a battery fault indication will occur and the charging process will terminate. If the circuit detects that the maximum run time has expired, then a battery fault indication will be given and the charging process will terminate. An optional trickle charge is sometimes used to "top-off" the battery. This is like the regular charge, but with a one second rest period between pulses. After charging the battery, the charger waits for the battery to be disconnected, upon disconnection the charger loops back to wait for the next battery. As an added safety mechanism to prevent sparking, only when the requisite minimum voltage is measured five times in a row in the span of approximately two and one-half seconds will the charger actually start the charging process. This allows the user to secure the connections.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for rapidly charging a battery comprising:
   an output adapted to be electrically connected to a battery; and
   a control device electrically connected to said output, said control device including a power supply and a microcontroller, said microcontroller including software for controlling said power supply and selecting and sequencing a plurality of software defined battery charging profiles to control the output of said power supply to the battery.

2. The apparatus of claim 1, wherein said control device further comprising:
   a charge pulse generator adapted to provide a charge pulse at said output to charge the battery;
   a discharge device adapted to provide a discharge pulse at said output to drain current from the battery to lower the impedance of the battery, with a predetermined ratio of the duration of the charge pulse to the discharge pulse; and
   a control device alternatively connecting said discharge device, and said charge pulse generator to said output so as to alternatingly provide said discharge pulse, and said charge pulse, and an electrically neutral rest period, respectively, to the battery, said discharge pulse, charge pulse, and rest period being applied to the battery in a predetermined charging sequence controlled by said microcontroller through said software, said discharge pulse is applied substantially immediately prior to said charge pulse in said predetermined charging sequence.

3. A method of rapidly charging a battery by a battery charger having a microcontroller with firmware and an input connected to a source of power, the battery charger providing charge pulses to the battery, the charging method comprising the steps of:
   a) running an initialization process for the battery charger;
   b) determining the type and rating of the battery to be charged;
   c) selecting an initial charging profile based on the battery information;
   d) running the initial battery charging stage;
   e) determining by comparing with predetermined time factors, whether voltage level of the battery has ramped up too rapidly or too slowly, and terminating charging process accordingly to protect the battery from being damaged;
   f) monitoring the condition of the battery; and
   g) selecting and running another battery charging stage upon sensing a predefined battery condition limit.

4. The method of claim 3, wherein the step of running an initialization process further comprises the step of determining whether a battery has been connected to the charger.

5. The method of claim 4, wherein said determining step further comprises the step of determining whether a battery has been connected to the charger further comprises the step of determining whether the voltage of the power supply is at its maximum but without current flow.

6. The method of claim 3, wherein said determining step (e) further comprises the step of sensing of a minimum rest voltage of the battery and selecting a charging sequence accordingly.

7. The method of claim 3, wherein said selecting step (c) further comprises the step of comparing the information acquired by said determining step (e) and matching said battery condition with an optimal charging profile.

8. The method of claim 7, wherein said charging profile comprises a plurality of charging stages including:
   a) a battery wake up stage;
   b) a bulk charge stage;
   c) an equalizing charge stage; and
   d) a constant holding voltage stage.

9. The method of claim 3, wherein said determining step (e) further comprises the step of taking at least two voltage measurements of the battery during at least one predetermined time interval.

10. The method of claim 3, wherein the step of monitoring the condition of the battery further comprises the step of sensing, at predetermined time intervals, the level of charge of the battery including taking measurements of the battery voltage and the clock time during the entire charging process.

11. The method of claim 3, wherein said selecting step (g) further comprises the step of comparing the monitored battery condition with a table of predefined battery condition patterns and stages and selecting a battery charging stage corresponding to a battery condition pattern which most closely matches the monitored battery condition.

12. A method of regulating the total output of power supply using a microcontroller with predefined instructions, the regulating method comprising the steps of:
   a) producing a pulse width modulation waveform based on the predefined instructions to control the power supply; and b) interleaving the pulse width modulation waveform to simulate increased resolution of the power supply.

13. The method of claim 12, wherein the step of producing a pulse width modulation waveform to control the power supply further comprises the steps of:
   a) dividing pulse width modulation state variables by a predetermined value, to set on-time, and storing the remainder;
   b) incrementing an internal wave counter;
   c) checking whether wave counter is larger than the predetermined value, and if larger, setting wave counter to zero;
   d) determining the relationship between said remainder and wave counter and incrementing on-time by a predetermined amount;
   e) checking whether off-time is at maximum, and if maximum, turning pulse width modulation on;
   f) checking whether on-time is at minimum, and if minimum, turning pulse width modulation off;
   g) setting off-time equal to total wave time minus on-time;
   h) decrementing both on and off times by an amount corresponding to the time the charger takes to actually turn on and off the pulse width modulation;
   i) checking whether on-time is more than off-time, and if true, turning off pulse width modulation; and
   j) checking whether on-time is more than off-time, and if untrue, turning on pulse width modulation.

14. The method of claim 13, wherein said checking step (e) further comprises the step of idling for the remaining time which is equivalent of total time minus pulse width modulation turn on-time.

15. The method of claim 13, wherein said checking step (f) further comprises the step of idling for the remaining time which is equivalent to total time equal minus pulse width modulation turn off-time.

16. The method of claim 12, further comprising the steps of:
   a) loading the battery in a load flow stage;
   b) resting pre-pulse in a rest flow stage;
   c) pulsing in a pulse flow stage;
   d) resting post-pulse in rest flow stage;
   e) checking timer whether time limit reached; and
   f) repeating steps a) through e) if within time limit.

17. The method of claim 16, further comprising the steps of:
   a) checking whether a load has been detected;
   b) applying a load;
   c) waiting for load-time; and
   d) checking whether time limit reached.

18. The method of claim 16, further comprising the steps of:
   a) checking whether the charger is in rest stage;
   b) waiting for rest time; and
   c) checking whether time limit has reached.

19. The method of claim 12, wherein said interleaving step further comprises the steps of:
   a) disabling interrupts;
   b) selecting current channel; and
   c) selecting voltage channel.

20. The method of claim 19, wherein the step of selecting current channel further comprises the steps of:
   a) setting a read counter;
   b) producing a pulse width modulation waveform to control the power supply;
   c) sensing current;
   d) adding the sensed current to a current tally;
   e) decrementing the read counter;
   f) checking whether the read counter reached zero;
   g) returning to step b) if the read counter is not zero, dividing the current tally by original read counter;
   h) checking whether a pulse is complete; and
   i) if complete, reenabling interrupts.

21. The method of claim 19, wherein the step of selecting voltage channel further comprising the steps of:
   a) setting a read counter;
   b) producing a pulse width modulation waveform to control the power supply;
   c) sensing voltage;
   d) adding the sensed voltage to a voltage tally;
   e) decrementing the read counter;
   f) checking whether the read counter reached zero;
   g) returning to step b) if the read counter is not zero, dividing the voltage tally by original voltage read counter;
   h) checking whether a pulse is complete; and
   i) if complete, reenabling interrupts.

22. A method of obtaining high resolution readings of an output of a power supply, the method comprising the steps of:
   a) generating a pulse width modulation waveform using software interleaving;
   b) taking an A/D measurement of the output of the power supply;
   c) adding said A/D measurement to an accumulator;
   d) repeating steps a) through c) until a predetermined number of measurements are taken; and
   e) dividing the accumulator total by the specified number of measurements to obtain a high resolution reading.

23. A machine-readable program storage device for storing encoded instructions for a method of regulating the total output of power supply using a microcontroller, the regulating method comprising the steps of:
   a) producing a pulse width modulation waveform according to a predetermined series of stages to control the power supply;
   b) interleaving the pulse width modulation waveform to simulate increased resolution of the power supply.

24. The machine-readable program storage device of claim 23, wherein said step of producing a pulse width modulation waveform to control the power supply further comprises the steps of:
   a) dividing pulse width modulation state variables by a predetermined value to set on-time and storing the remainder microseconds;
   b) incrementing internal wave counter;
   c) checking whether wave counter is larger than the predetermined value, and if larger, setting wave counter to zero;
   d) determining the relationship between said remainder and wave counter and incrementing on-time by a predetermined amount accordingly;
   e) checking whether off-time is at maximum, and if maximum, turning pulse width modulation on;
   f) checking whether on-time is at minimum, and if minimum, turning pulse width modulation off;

g) setting off-time equal to total wave time minus on-time;

h) decrementing both on and off times by an amount corresponding to the time the charger takes to actually turn on and off the pulse width modulation;

i) checking whether on-time is more than off-time, and if true, turning off pulse width modulation; and j) checking whether on-time is more than off-time, and if untrue, turning on pulse width modulation.

25. The machine-readable program storage device of claim 24, wherein said checking step (e) further comprises the step of idling for the remaining time which is equivalent of total time minus pulse width modulation turn on-time.

26. The machine-readable program storage device of claim 24, wherein said checking step (f) further comprising the steps of idling for the remaining time which is equivalent to total time equal minus pulse width modulation turn off time.

27. The machine-readable program storage device of claim 23, further comprising the steps of:

a) loading the battery in a load flow stage;

b) resting pre-pulse in a rest flow stage;

c) pulsing in a pulse flow stage;

d) resting post-pulse in rest flow stage;

e) checking timer whether time limit reached; and f) repeating steps a) through e) if within time limit.

28. The machine-readable program storage device of claim 27 further comprising the steps of:

a) checking whether a load has been detected;

b) applying a load;

c) waiting for load-time; and d) checking whether time limit reached.

29. The machine-readable program storage device of claim 27, wherein the step of running the firmware in a rest flow stage further comprising the steps of:

a) checking whether the charger is in rest stage;

b) waiting for rest time; and c) checking whether time limit has reached.

30. The machine-readable program storage device of claim 23, wherein the step of using a software interleave of the pulse width modulation waveform to simulate increased resolution of the power supply further comprising the steps of:

a) disabling interrupts;

b) selecting current channel; and c) selecting voltage channel.

31. The machine-readable program storage device of claim 30, wherein the step of selecting current channel further comprises the steps of:

a) setting a read counter;

b) producing a pulse width modulation waveform to control the power supply;

c) sensing current;

d) adding the sensed current to a current tally;

e) decrementing the read counter;

f) checking whether the read counter reached zero; and g) returning to step b) if the read counter is not zero;

h) checking whether a pulse is completed; and i) reenabling interrupts.

32. The machine-readable program storage device of claim 30, wherein the step of selecting voltage channel further comprising the steps of:

a) setting a read counter;

b) producing a pulse width modulation waveform to control the power supply;

c) sensing voltage;

d) adding the sensed voltage to a voltage tally;

e) decrementing the read counter;

f) checking whether reading counter reached zero;

g) returning to step b) if the read counter is not zero, and dividing the voltage tally by the original voltage read counter;

h) checking whether a pulse is complete; and i) if complete, reenabling interrupts.

* * * * *